(12) United States Patent
Oguro

(10) Patent No.: US 11,738,755 B2
(45) Date of Patent: Aug. 29, 2023

(54) VEHICLE CONTROLLING APPARATUS

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 373 days.

(21) Appl. No.: 17/178,842

(22) Filed: Feb. 18, 2021

(65) Prior Publication Data

US 2021/0309228 A1     Oct. 7, 2021

(30) Foreign Application Priority Data

Apr. 2, 2020   (JP) ................................ 2020-066816

(51) Int. Cl.
| | |
|---|---|
| *B60K 6/52* | (2007.10) |
| *B60W 20/10* | (2016.01) |
| *B60W 30/18* | (2012.01) |
| *B60K 1/02* | (2006.01) |
| *B60K 17/356* | (2006.01) |

(52) U.S. Cl.
CPC ......... *B60W 30/18172* (2013.01); *B60K 1/02* (2013.01); *B60K 17/356* (2013.01); *B60K 6/52* (2013.01); *B60W 20/10* (2013.01); *B60W 2520/26* (2013.01); *B60W 2710/083* (2013.01); *B60W 2720/26* (2013.01); *B60Y 2200/91* (2013.01); *B60Y 2200/92* (2013.01); *B60Y 2300/18175* (2013.01); *B60Y 2400/82* (2013.01)

(58) Field of Classification Search
CPC .................................. B60L 3/10; B60L 3/102
See application file for complete search history.

(56) References Cited

U.S. PATENT DOCUMENTS

| | | | |
|---|---|---|---|
| 2020/0001716 A1* | 1/2020 | Takano | ................ B62D 5/0463 |
| 2020/0070863 A1* | 3/2020 | Kumar | .................... B61L 3/006 |

FOREIGN PATENT DOCUMENTS

| | | | |
|---|---|---|---|
| JP | 2000-079831 A | 3/2000 | |
| JP | 2006-136175 A | 5/2006 | |
| JP | 2008-278702 A | 11/2008 | |

* cited by examiner

*Primary Examiner* — Peter D Nolan
*Assistant Examiner* — Jacob Kent Besteman-Street
(74) *Attorney, Agent, or Firm* — McDermott Will & Emery LLP

(57) ABSTRACT

A vehicle controlling apparatus includes first and second slip determining units, first and second slip controllers, and a target torque corrector. The first slip controller is configured to maintain a slip rate of a first drive wheel at a predetermined slip rate, in a case where an execution condition of a first slip control is determined by the first slip determining unit as being satisfied. The second slip controller is configured to maintain a slip rate of a second drive wheel at a predetermined slip rate, in a case where an execution condition of a second slip control is determined by the second slip determining unit as being satisfied. The target torque corrector is configured to decrease a target torque of a second motor, in a case where the execution condition of the first slip control is satisfied and where the execution condition of the second slip control is unsatisfied.

13 Claims, 15 Drawing Sheets

VEHICLE CONTROLLING APPARATUS

CROSS-REFERENCE TO RELATED APPLICATIONS

The present application claims priority from Japanese Patent Application No. 2020-066816 filed on Apr. 2, 2020, the entire contents of which are hereby incorporated by reference.

BACKGROUND

The technology relates to a vehicle controlling apparatus that controls a first motor coupled to a first drive wheel and a second motor coupled to a second drive wheel.

A vehicle such as an electric vehicle or a hybrid vehicle includes a traveling motor that drives a wheel. For example, reference is made to Japanese Unexamined Patent Application Publication Nos. 2000-79831, 2006-136175, and 2008-278702. An all-wheel-drive vehicle has also been developed that includes a front wheel motor and a rear wheel motor as the traveling motors.

SUMMARY

An aspect of the technology provides a vehicle controlling apparatus configured to control a first motor coupled to a first drive wheel and a second motor coupled to a second drive wheel. The first drive wheel and the second drive wheel are disposed at front and rear of a vehicle. The vehicle controlling apparatus includes a first slip determining unit, a first slip controller, a second slip determining unit, a second slip controller, and a target torque corrector. The first slip determining unit is configured to determine whether an execution condition of a first slip control is satisfied, on the basis of an idling state of the first drive wheel. The first slip controller is configured to control the first motor and maintain a slip rate of the first drive wheel at a predetermined first slip rate, in a case where the execution condition of the first slip control is determined by the first slip determining unit as being satisfied. The second slip determining unit is configured to determine whether an execution condition of a second slip control is satisfied, on the basis of an idling state of the second drive wheel. The second slip controller is configured to control the second motor and maintain a slip rate of the second drive wheel at a predetermined second slip rate, in a case where the execution condition of the second slip control is determined by the second slip determining unit as being satisfied. The target torque corrector is configured to decrease a target torque of the second motor, in a case where the execution condition of the first slip control is determined by the first slip determining unit as being satisfied and where the execution condition of the second slip control is determined by the second slip determining unit as being unsatisfied.

An aspect of the technology provides a vehicle controlling apparatus configured to control a first motor coupled to a first drive wheel and a second motor coupled to a second drive wheel. The first drive wheel and the second drive wheel are disposed at front and rear of a vehicle. The vehicle controlling apparatus includes circuitry configured to determine whether an execution condition of a first slip control is satisfied, on the basis of an idling state of the first drive wheel, control the first motor and maintain a slip rate of the first drive wheel at a predetermined first slip rate, in a case where the execution condition of the first slip control is determined as being satisfied, determine whether an execution condition of a second slip control is satisfied, on the basis of an idling state of the second drive wheel, control the second motor and maintain a slip rate of the second drive wheel at a predetermined second slip rate, in a case where the execution condition of the second slip control is determined as being satisfied, and decrease a target torque of the second motor, in a case where the execution condition of the first slip control is determined as being satisfied and where the execution condition of the second slip control is determined as being unsatisfied.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
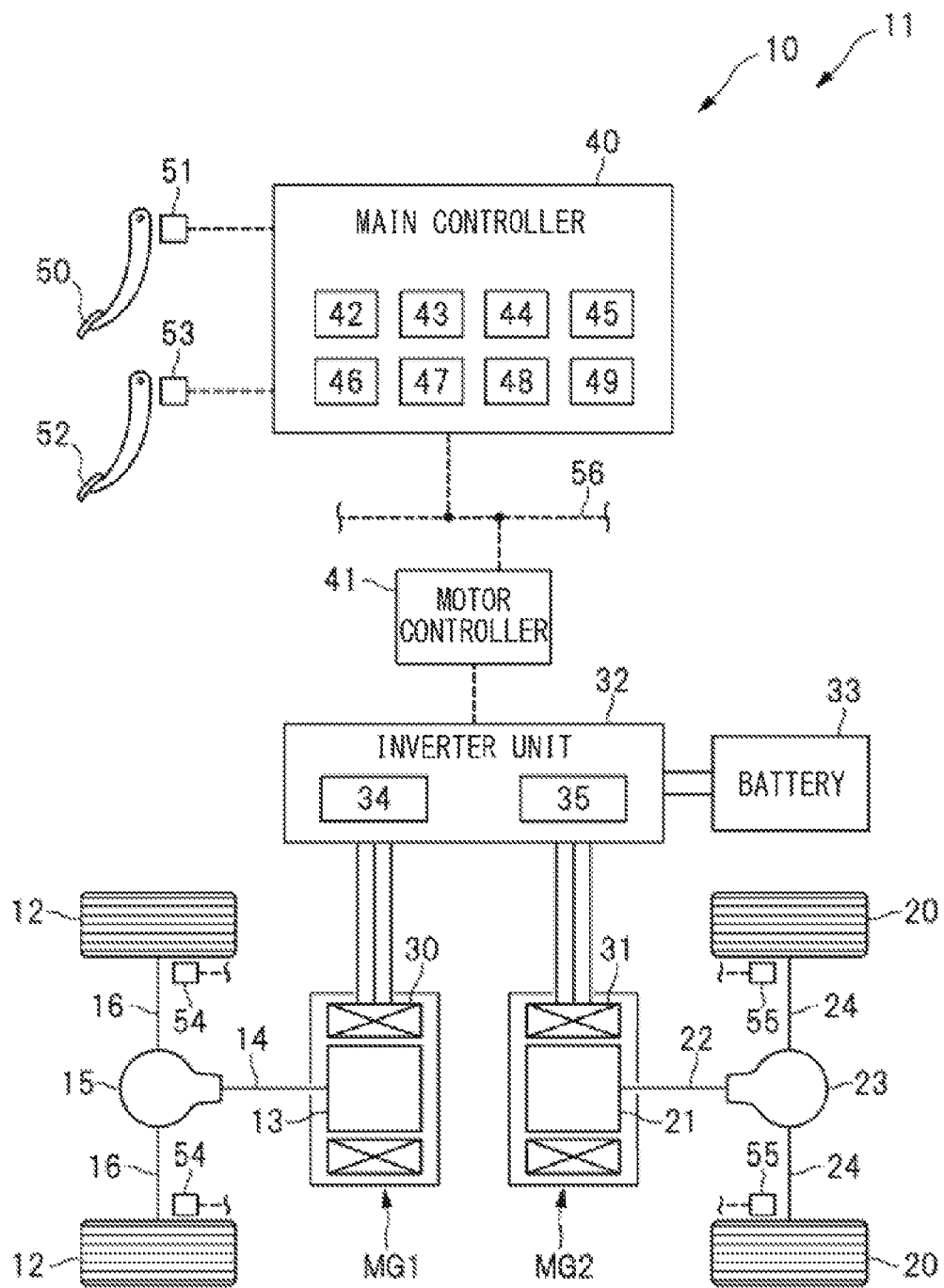
FIG. 1 is a schematic diagram illustrating an example of a configuration of a vehicle including a vehicle controlling apparatus according to one example embodiment of the technology.

To increase traveling stability upon traveling on a frozen road surface or any other road with low $\mu$, a slip control is executed in a vehicle such as an electric vehicle as well. The slip control suppresses a torque of a traveling motor upon idling of wheels. Executing the slip control makes it possible to rotate the wheels at a predetermined slip rate and thereby makes it possible to increase the traveling stability upon traveling on the frozen road surface or the like. The slip control that suppresses the idling of the wheels suppresses the motor torque after the wheels have started to idle. What is desired is to further increase the traveling stability of the vehicle by controlling the motor torque further appropriately.

It is desirable to provide a vehicle controlling apparatus that makes it possible to increase traveling stability of a vehicle.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Vehicle Configuration]

FIG. 1 schematically illustrates an example of a configuration of a vehicle 11 including a vehicle controlling apparatus 10 according to an example embodiment of the technology. Referring to FIG. 1, the vehicle 11 includes a motor generator MG1 that drives front wheels 12. In one embodiment, the motor generator MG1 may serve as a "first motor". In one embodiment, the front wheels 12 may serve as a "first drive wheel". The motor generator MG1 has a rotor 13 that is coupled to the front wheels 12 via a motor output shaft 14, a front differential mechanism 15, and a front wheel drive shaft 16. The vehicle 11 also includes a motor generator MG2 that drives rear wheels 20. In one embodiment, the motor generator MG2 may serve as a "second motor". In one embodiment, the rear wheels 20 may serve as a "second drive wheel". The motor generator MG2 has a rotor 21 that is coupled to the rear wheels 20 via a motor output shaft 22, a rear differential mechanism 23, and a rear wheel drive shaft 24. The motor generators MG1 and MG2 may respectively include a stator 30 and a stator 31 that are coupled to a battery 33 via an inverter unit that serves as a power converter. The battery 33 may be a lithium-ion battery. The inverter unit 32 may include an inverter 34 and an inverter 35. The inverter 34 may couple the stator 30 and the battery 33. The inverter 35 may couple the stator 31 and the battery 33.

The vehicle controlling apparatus 10 may include a main controller 40 and a motor controller 41 in order to control a torque and a rotation speed of each of the motor generators MG1 and MG2. The main controller 40 and the motor controller 41 each may be or may include a microcomputer. The main controller 40 may include a driving force setting unit 42, a first motor controller 43, and a second motor controller 44. The driving force setting unit 42 of the main controller 40 may set a requested driving force Fv of the vehicle 11 on the basis of, for example, an accelerator operated by a driver. Further, the driving force setting unit 42 may so distribute the requested driving force Fv as to cause the requested driving force Fv to be divided into a requested driving force Fft of the front wheels 12 (hereinafter simply referred to as a "front wheel requested driving force Fft") and a requested driving force Frr of the rear wheels 20 (hereinafter simply referred to as a "rear wheel requested driving force Frr"). Note that a ratio of the distribution of the requested driving force Fv between the front wheels 12 and the rear wheels 20 may be based on a preset fixed distribution ratio, or may be based on a distribution ratio that varies depending on a traveling state.

The first motor controller 43 of the main controller 40 may set a target torque Tm1 of the motor generator MG1 on the basis of the front wheel requested driving force Fft, and may output the target torque Tm1 to the motor controller 41. In a case where the motor controller 41 receives the target torque Tm1, the motor controller 41 may set, for example, a target current value corresponding to the target torque Tm1, and may control the inverter 34 on the basis of the target current value. Similarly, the second motor controller 44 of the main controller 40 may set a target torque Tm2 of the motor generator MG2 on the basis of the rear wheel requested driving force Frr, and may output the target torque Tm2 to the motor controller 41. In a case where the motor controller 41 receives the target torque Tm2, the motor controller 41 may set, for example, a target current value corresponding to the target torque Tm2, and may control the inverter 35 on the basis of the target current value.

The main controller 40 includes a first slip determining unit 45, a first slip controller 46, a second slip determining unit 47, a second slip controller 48, and a target torque corrector 49. As described later in greater detail, the first slip determining unit 45 determines whether an execution condition of a first slip control is satisfied, on the basis of a slip rate of the front wheels 12. If the first slip determining unit 45 determines that the execution condition of the first slip control is satisfied, the first slip controller 46 executes, as the first slip control, a torque control of the motor generator MG1 to cause the front wheels 12 to be rotated with a predetermined slip rate of the front wheels 12 being maintained. Similarly, the second slip determining unit 47 determines whether an execution condition of a second slip control is satisfied, on the basis of a slip rate of the rear wheels 20. If the second slip determining unit 47 determines that the execution condition of the second slip control is satisfied, the second slip controller 48 executes, as the second slip control, a torque control of the motor generator MG2 to cause the rear wheels 20 to be rotated with a predetermined slip rate of the rear wheels 20 being maintained. The target torque corrector 49 corrects the target torque Tm2 of the motor generator MG2 in a later-described behavior stability control. Note that a control signal from the first slip controller 46 may be outputted to the motor controller 41 via the first motor controller 43, and control signals from the second slip controller 48 and the target torque corrector 49 may be outputted to the motor controller 41 via the second motor controller 44.

The main controller 40 may be coupled to various sensors. The sensors may include an accelerator sensor 51 that detects an amount of pressing (hereinafter referred to as an accelerator position Acc) performed on an accelerator pedal 50, and a brake sensor 53 that detects an amount of pressing performed on a brake pedal 52. The sensors may also include a front wheel rotation sensor 54 that detects a rotation speed of the front wheels 12 (hereinafter referred to as a front wheel speed Vft), and a rear wheel rotation sensor 55 that detects a rotation speed of the rear wheels 20 (hereinafter referred to as a rear wheel speed Vrr). Note that the main controller 40 and the motor controller 41 may be so coupled to each other that a communication is performed freely therebetween via an in-vehicle network 56 such as CAN (Controller Area Network).

Figure 2:
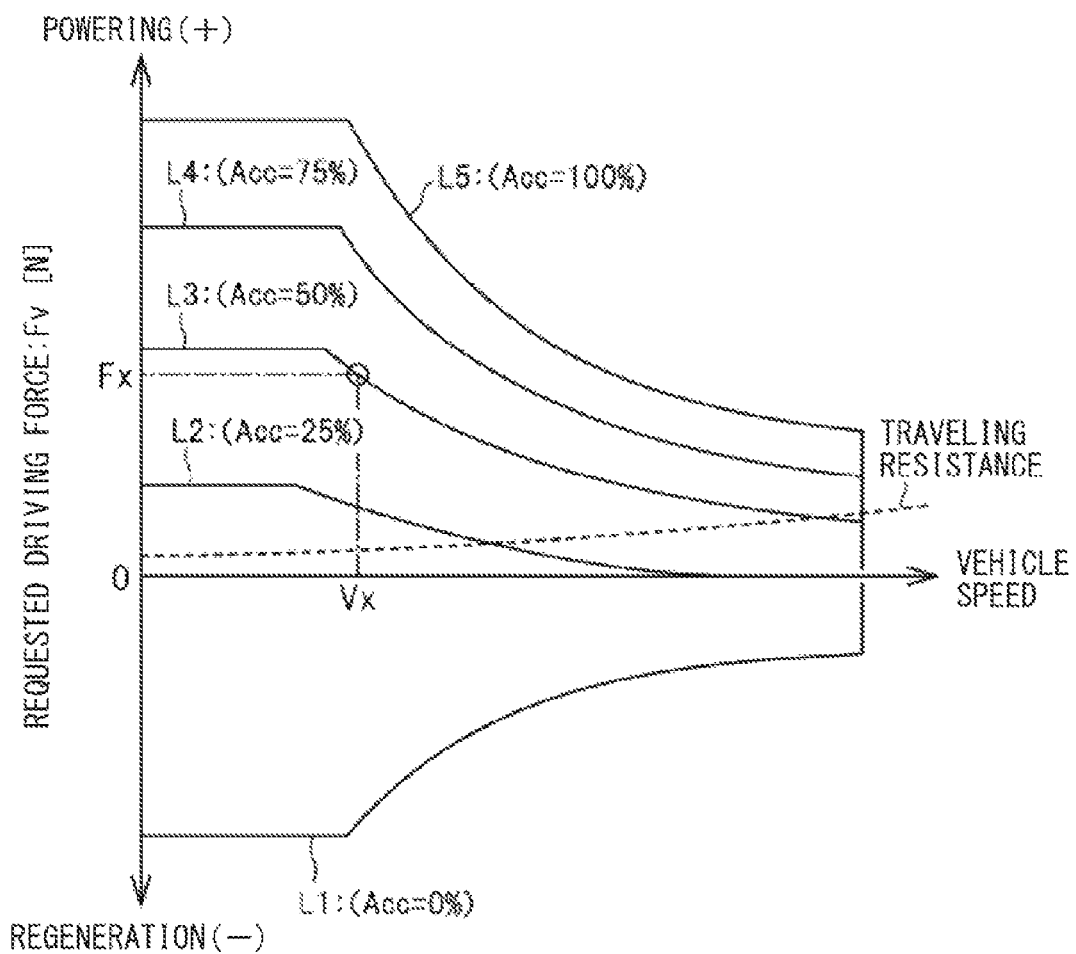
FIG. 2 is a diagram illustrating an example of a driving force map that illustrates a requested driving force.

FIG. 2 illustrates an example of a driving force map that illustrates the requested driving force Fv. Referring to FIG.

2, characteristics lines L1 to L5 each indicating the requested driving force Fv for the corresponding accelerator position Acc may be set for the driving force map. For example, the requested driving force Fv may be set along the characteristic line L1 in a case where the accelerator position Acc is 0%, and the requested driving force Fv may be set along the characteristic line L2 in a case where the accelerator position Acc is 25%. Similarly, the requested driving force Fv may be set along the characteristic line L3 in a case where the accelerator position Acc is 50%, the requested driving force Fv may be set along the characteristic line L4 in a case where the accelerator position Acc is 75%, and the requested driving force Fv may be set along the characteristic line L5 in a case where the accelerator position Acc is 100%. In an example case where the accelerator position Acc is "50%" and the vehicle speed is "Vx", "Fx" may be set as the requested driving force Fv requested by the driver. Note that five characteristics lines L1 to L5 are set for the driving force map illustrated in an example of FIG. 2, although the number of characteristics lines is not limited thereto. In some embodiments, the driving force map may be used in which six or more characteristic lines are set.

[Slip Control (Timing Chart)]

Figure 3:
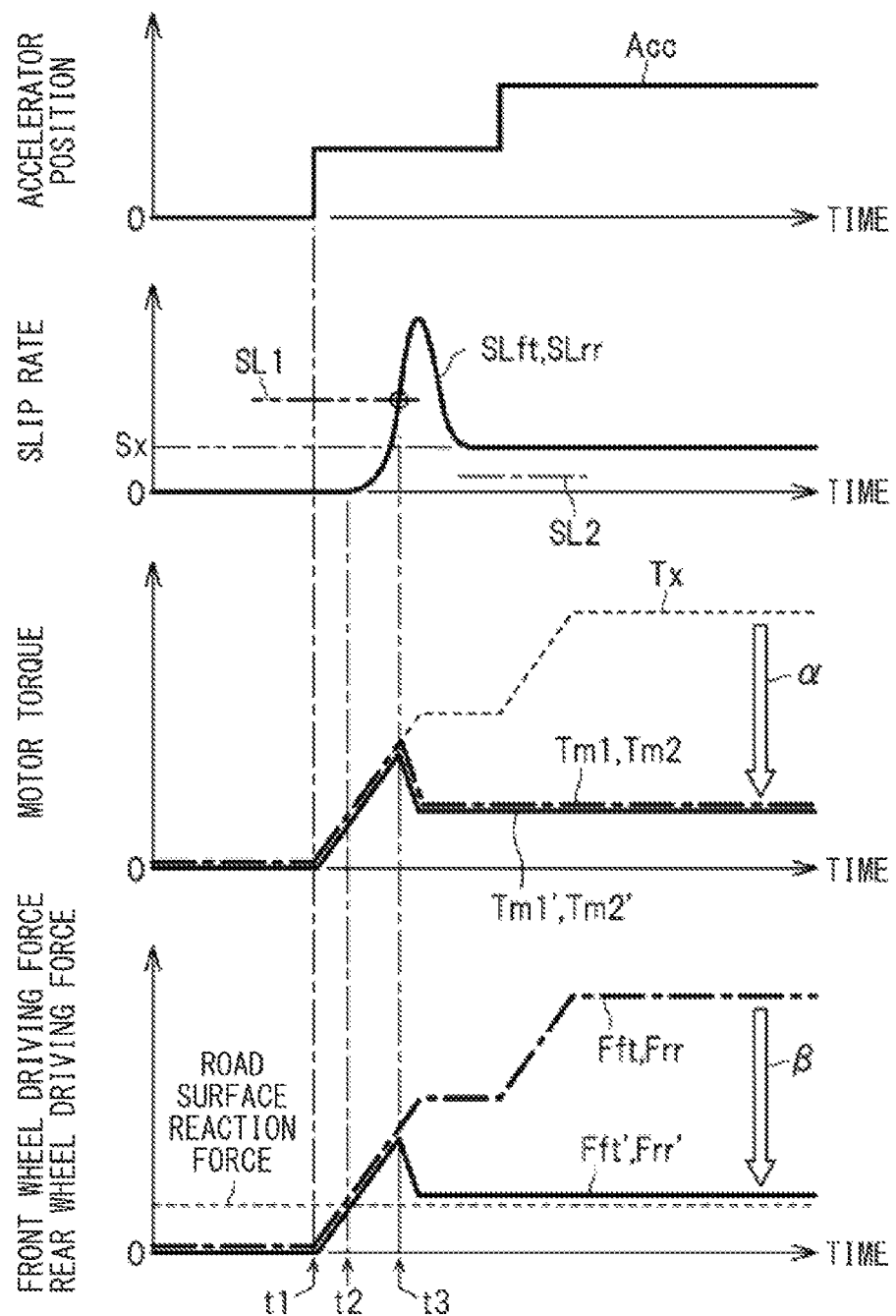
FIG. 3 is a timing chart illustrating an example of a state in which a slip control is executed for a low $\mu$ road.

A description is given next of the first slip control of the front wheels 12 and the second slip control of the rear wheels 20. FIG. 3 is a timing chart illustrating an example of a state in which the slip control is executed for a low μ road. Note that the first slip control of the front wheels 12 and the second slip control of the rear wheels 20 may be a control common to each other. Accordingly, both the first and the second slip controls are illustrated collectively in the timing chart illustrated in FIG. 3. It is to be also noted that lines are depicted as being slightly shifted from each other even in a case where those lines are actually overlapped with each other, in order to clarify the transitions of the torque, the driving force, and any other factor.

In an example embodiment described below, a slip rate SLft of the front wheels 12 may be a value representing an idling state of the front wheels 12 and calculated on the basis of Expression (1) described below. A slip rate SLrr of the rear wheels 20 may be a value representing an idling state of the rear wheels 20 and calculated on the basis of Expression (2) described below. In the Expressions (1) and (2), "Vv" denotes the vehicle speed, i.e., a speed of movement of a body of the vehicle 11. For example, in a case where the front wheel speed Vft and the rear wheel speed Vrr coincide with the vehicle speed Vv without the idling of the front wheels 12 and the rear wheels 20, the slip rate SLft and the slip rate SLrr are calculated as being 0%. In a case where the front wheels 12 and the rear wheels 20 idle and the front wheel speed Vft and the rear wheel speed Vrr exceed the vehicle speed Vv accordingly, the slip rate SLft and the slip rate SLrr are calculated as being greater than 0%. Note that the vehicle speed Vv may be a rotation speed that is the slowest between the rotation speed of the front wheels 12 and the rotation speed of the rear wheels 20. In some embodiments, the vehicle speed Vv may be calculated on the basis of a vehicle acceleration rate or the like. In some embodiments, the vehicle speed Vv may be calculated on the basis of a positioning signal of GPS (Global Positioning System).

$$SLft=\{(Vft-Vv)/Vv\}\times 100 \quad (1)$$

$$SLrr=\{(Vrr-Vv)/Vv\}\times 100 \quad (2)$$

The slip control mentioned above may adjust the motor torques of the respective motor generators MG1 and MG2 to maintain the slip rate SLft of the front wheels 12 and the slip rate SLrr of the rear wheels 20 at a predetermined slip rate, in a case where the front wheels 12 and the rear wheels 20 idle on the low μ road such as a frozen road surface. For example, the predetermined slip rate may be 10%. By executing the slip control, it is possible to prevent the excessive idling of the front wheels 12 and the rear wheels 20, and thereby to increase traveling stability upon traveling on the frozen road surface or the like. Non-limiting examples of an execution condition of the slip control include a case where the slip rates SLft and SLrr exceed a predetermined threshold SL1. For example, whether the execution condition of the slip control is satisfied may be determined on the basis of the slip rate SLft of the front wheels 12 and the slip rate SLrr of the rear wheels 20. Non-limiting examples of a stop condition of the slip control include a case where the slip rates SLft and SLrr fall below a predetermined threshold SL2.

At a timing t1 illustrated in FIG. 3, in a case where the accelerator position Acc increases by the pressing of the accelerator pedal 50, the front wheel requested driving force Fft and the rear wheel requested driving force Frr start to increase and the target torque Tm1 of the motor generator MG1 and the target torque Tm2 of the motor generator MG2 start to increase. Further, actual motor torques Tm1' and Tm2' so increase as to follow the target torques Tm1 and Tm2, and actual driving force Fft' of the front wheels 12 and actual driving force Frr' of the rear wheels 20 increase. Note that the actual motor torques Tm1' and Tm2' are motor torques [Nm] actually outputted from the respective motor generators MG1 and MG2, and the actual driving forces Fft' and Frr' are driving forces [N] actually outputted from the respective front wheels 12 and rear wheels 20.

At a timing t2, in a case where the actual driving force Fft' of the front wheels 12 and the actual driving force Frr' of the rear wheels 20 so increase as to exceed a road surface reaction force, the slip rates SLft and SLrr start to increase by the idling of the front wheels 12 and the rear wheels 20. At a timing t3, in a case where the slip rates SLft and SLrr exceed the threshold SL1, the slip control may be executed that decreases the target torques Tm1 and Tm2, in order to suppress the idling of the front wheels 12 and the rear wheels 20.

The slip control may so control the target torque Tm1 of the motor generator MG1 and the target torque Tm2 of the motor generator MG2 as to cause the slip rate SLft of the front wheels 12 and the slip rate SLrr of the rear wheels 20 to be maintained at a target slip rate Sx. For example, the target slip rate Sx may be 10%. For example, the target torques Tm1 and Tm2 may be so set as to be decreased in a case where the slip rates SLft and SLrr exceed the target slip rate Sx, and the target torques Tm1 and Tm2 may be so set as to be increased in a case where the slip rates SLft and SLrr fall below the target slip rate Sx. Hence, it is possible to maintain the slip rates SLft and SLrr at the target slip rate Sx even in a situation where the front wheels 12 and the rear wheels 20 idle, and thereby to increase the traveling stability of the vehicle 11.

In other words, even in a situation where the front wheel requested driving force Fft and the rear wheel requested driving force Frr are set to large values by the pressing of the accelerator pedal 50 and thus the target torques Tm1 and Tm2 are likely to be set to large values as denoted by a broken line Tx, the target torques Tm1 and Tm2 are so set as to be decreased as denoted by an arrow α. Thus, it is possible to decrease the actual driving force Fft' of the front wheels 12 and the actual driving force Frr' of the rear wheels 20 as denoted by an arrow β. Hence, it is possible to prevent the excessive idling of the front wheels 12 and the rear wheels 20, and thereby to increase the traveling stability of the vehicle 11 upon traveling on the low μ road.

[Slip Control (Flowcharts)]

Figure 4:
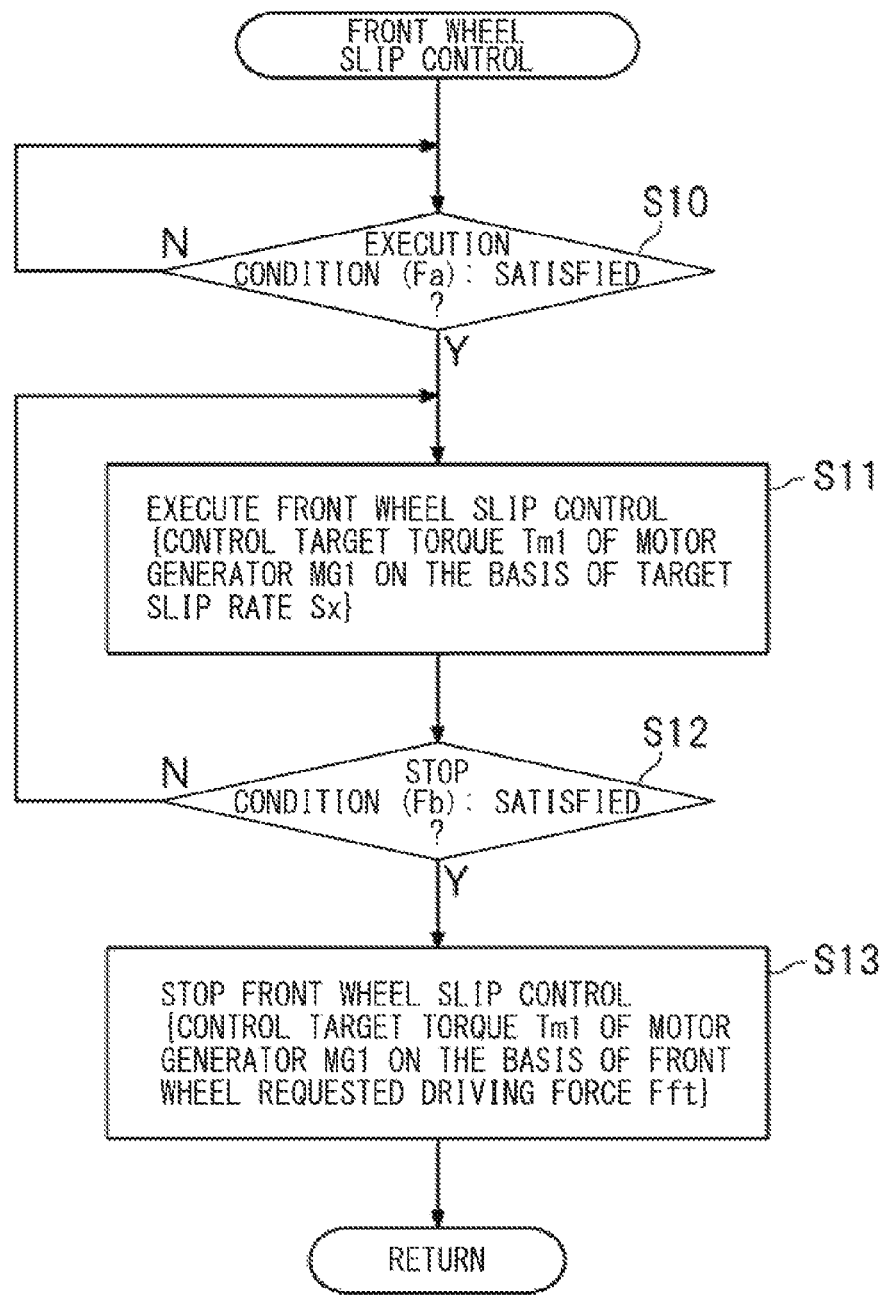
FIG. 4 is a flowchart illustrating an example of a process of executing a first slip control of front wheels.
Figure 5:
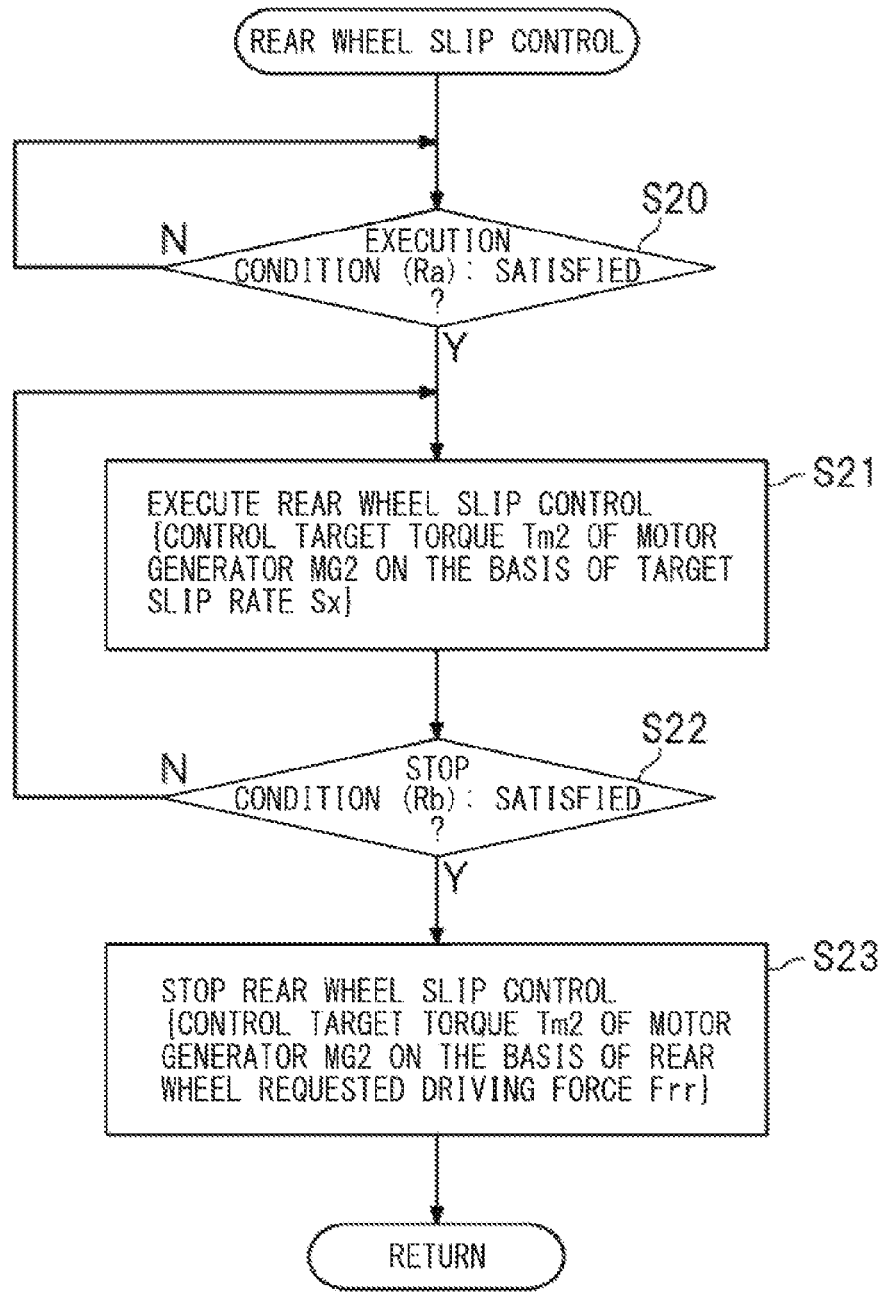
FIG. 5 is a flowchart illustrating an example of a process of executing a second slip control of rear wheels.

A description is given next of processes of executing the first slip control and the second slip control with reference to flowcharts. FIG. 4 is a flowchart illustrating an example of the process of executing the first slip control of the front wheels 12. FIG. 5 is a flowchart illustrating an example of the process of executing the second slip control of the rear wheels 20. Note that, in the following description, the first slip control of the front wheels 12 is referred to as a "front wheel slip control", and the second slip control of the rear wheels 20 is referred to as a "rear wheel slip control". It is to be also noted that the execution condition of the first slip control is referred to as an "execution condition Fa", the stop condition of the first slip control is referred to as a "stop condition Fb", the execution condition of the second slip control is referred to as an "execution condition Ra", and the stop condition of the second slip control is referred to as a "stop condition Rb".

Described first is the front wheel slip control. Referring to FIG. 4, in step S10, whether the execution condition Fa of the front wheel slip control is satisfied may be determined on the basis of, for example, the slip rate SLft of the front wheels 12. If the execution condition Fa is determined as being satisfied in step S10, the process may proceed to step S11 to execute the front wheel slip control. For example, in step S11, the target torque Tm1 of the motor generator MG1 may be so controlled as to cause the slip rate SLft of the front wheels 12 to be maintained at the target slip rate Sx. Thereafter, in step S12, whether the stop condition Fb of the front wheel slip control is satisfied may be determined on the basis of, for example, the slip rate SLft of the front wheels 12. If the stop condition Fb is determined as being satisfied in step S12, the process may proceed to step S13 to stop the front wheel slip control. In step S13, the target torque Tm1 of the motor generator MG1 may be controlled on the basis of the front wheel requested driving force Fft.

Described next is the rear wheel slip control. Referring to FIG. 5, in step S20, whether the execution condition Ra of the rear wheel slip control is satisfied may be determined on the basis of, for example, the slip rate SLrr of the rear wheels 20. If the execution condition Ra is determined as being satisfied in step S20, the process may proceed to step S21 to execute the rear wheel slip control. For example, in step S21, the target torque Tm2 of the motor generator MG2 may be so controlled as to cause the slip rate SLrr of the rear wheels 20 to be maintained at the target slip rate Sx. Thereafter, in step S22, whether the stop condition Rb of the rear wheel slip control is satisfied may be determined on the basis of, for example, the slip rate SLrr of the rear wheels 20. If the stop condition Rb is determined as being satisfied in step S22, the process may proceed to step S23 to stop the rear wheel slip control. In step S23, the target torque Tm2 of the motor generator MG2 may be controlled on the basis of the rear wheel requested driving force Frr.

[Behavior Stability Control (Flowchart)]

As described previously, executing the front wheel slip control and the rear wheel slip control makes it possible to increase the traveling stability upon traveling on the low μ road. However, a behavior of the vehicle 11 can temporarily be disturbed in a case where the vehicle 11 enters the low μ road from a high μ road. That is, the actual driving force Frr' of the rear wheels 20 is at a magnitude corresponding to the high μ road immediately after the vehicle 11 traveling forward has entered the low μ road. In this case, the actual driving force Frr' is large with respect to the road surface reaction force of the low μ road, which can lead to excessive idling of the rear wheels 20. Accordingly, the vehicle controlling apparatus 10 executes the behavior stability control that corrects the target torque Tm2 of the motor generator MG2 prior to the rear wheel slip control.

Figure 6:
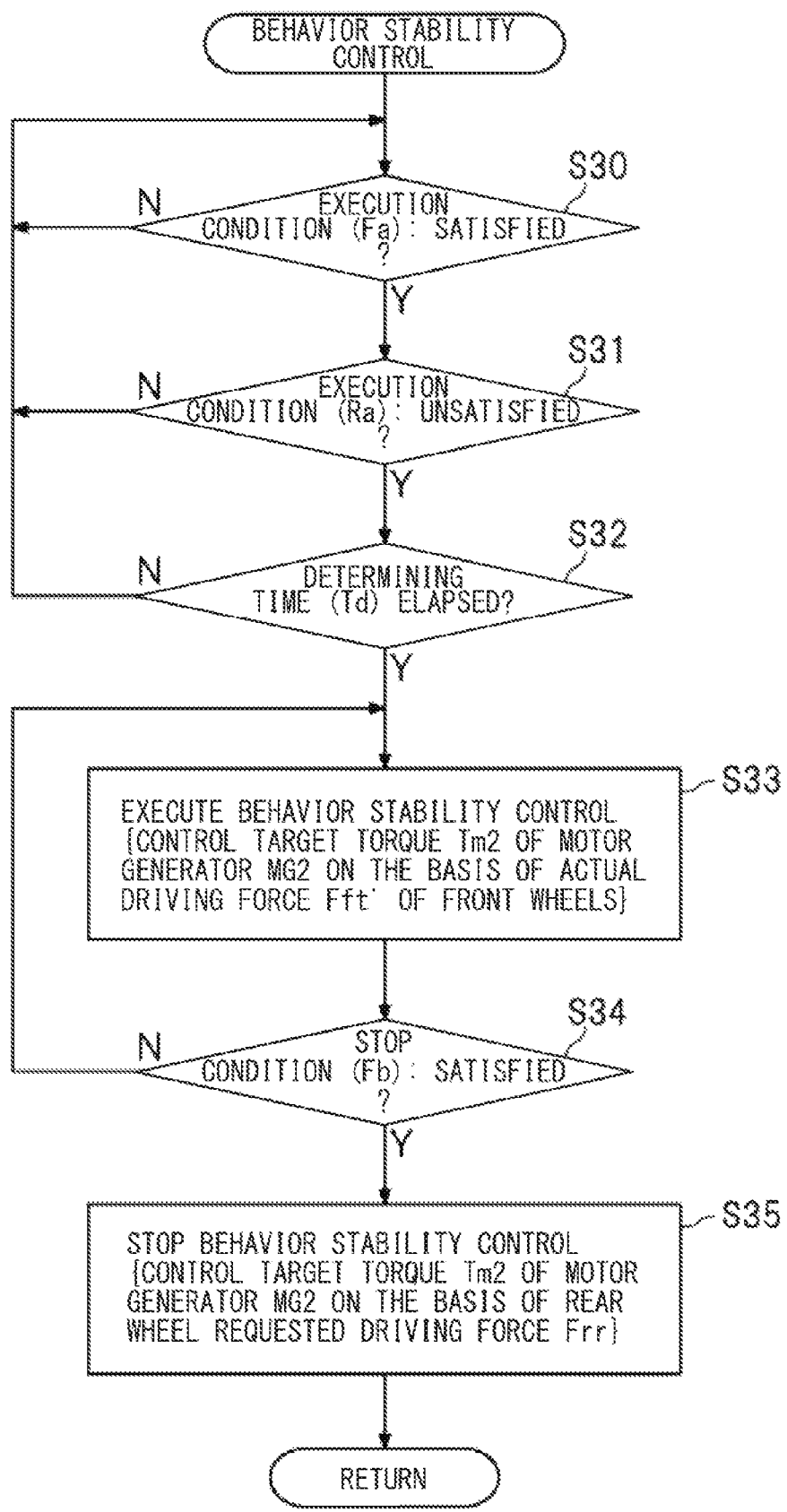
FIG. 6 is a flowchart illustrating an example of a process of executing a behavior stability control.

FIG. 6 is a flowchart illustrating an example of a process of executing the behavior stability control. Referring to FIG. 6, in step S30, whether the execution condition Fa of the front wheel slip control is satisfied may be determined on the basis of, for example, the slip rate SLft of the front wheels 12. If the execution condition Fa is determined as being satisfied in step S30, the process may proceed to step S31. In step S31, whether the execution condition Ra of the rear wheel slip control is unsatisfied may be determined on the basis of, for example, the slip rate SLrr of the rear wheels 20. If the execution condition Ra of the rear wheel slip control is determined as being unsatisfied in step S31, the process may proceed to step S32. In step S32, whether a predetermined determining time Td has elapsed may be determined. In some embodiments, the determining time Td may be any of several milliseconds. In some embodiments, the determining time Td may be any of tens of milliseconds. In step S32, if the determining time Td is determined as being elapsed, i.e., if the execution condition Fa is satisfied and a state in which the execution condition Ra is unsatisfied is continued for the determining time Td, the process may proceed to step S33 to execute the behavior stability control.

As described above, the process may proceed to step S33 to execute the behavior stability control, in a case where the execution condition Fa of the front wheel slip control is satisfied and the execution condition Ra of the rear wheel slip control is unsatisfied. In an example embodiment, the behavior stability control controls the target torque Tm2 of the motor generator MG2 on the basis of the actual driving force Fft' of the front wheels 12. For example, the target torque Tm2 of the motor generator MG2 may be so set prior to the rear wheel slip control as to be decreased from the most recent target torque such that the actual driving force Frr' of the rear wheels 20 is converged to the actual driving force Fft' of the front wheels 12. In a case where the front wheel slip control is executed due to the idling of the front wheels 12, the rear wheel slip control is expected to be executed thereafter due to idling of the rear wheels 20. Accordingly, in an example embodiment, the behavior stability control may be executed that decreases the target torque Tm2 prior to the rear wheel slip control. Hence, it is possible to decrease the actual driving force Frr' of the rear wheels 20 without waiting for the idling of the rear wheels 20 and thereby to increase the traveling stability upon the entry of the vehicle 11 to the low μ road.

Thereafter, in step S34, whether the stop condition Fb of the front wheel slip control is satisfied may be determined. If the stop condition Fb is determined as not being satisfied in step S34, the process may return to step S33 in which the behavior stability control is continued that causes the actual driving force Frr' of the rear wheels 20 to follow the actual driving force Fft' of the front wheels 12. If the stop condition Fb is determined as being satisfied in step S34, the process may proceed to step S35 because the idling of the front wheels 12 is resolved. In step S35, the behavior stability control may be stopped. In a case where the behavior stability control is thus stopped, as per normal, the target torque Tm2 of the motor generator MG2 may be controlled on the basis of the rear wheel requested driving force Frr set in accordance with, for example, the operation of the accelerator.

[Behavior Stability Control (Timing Chart)]

Figure 7:
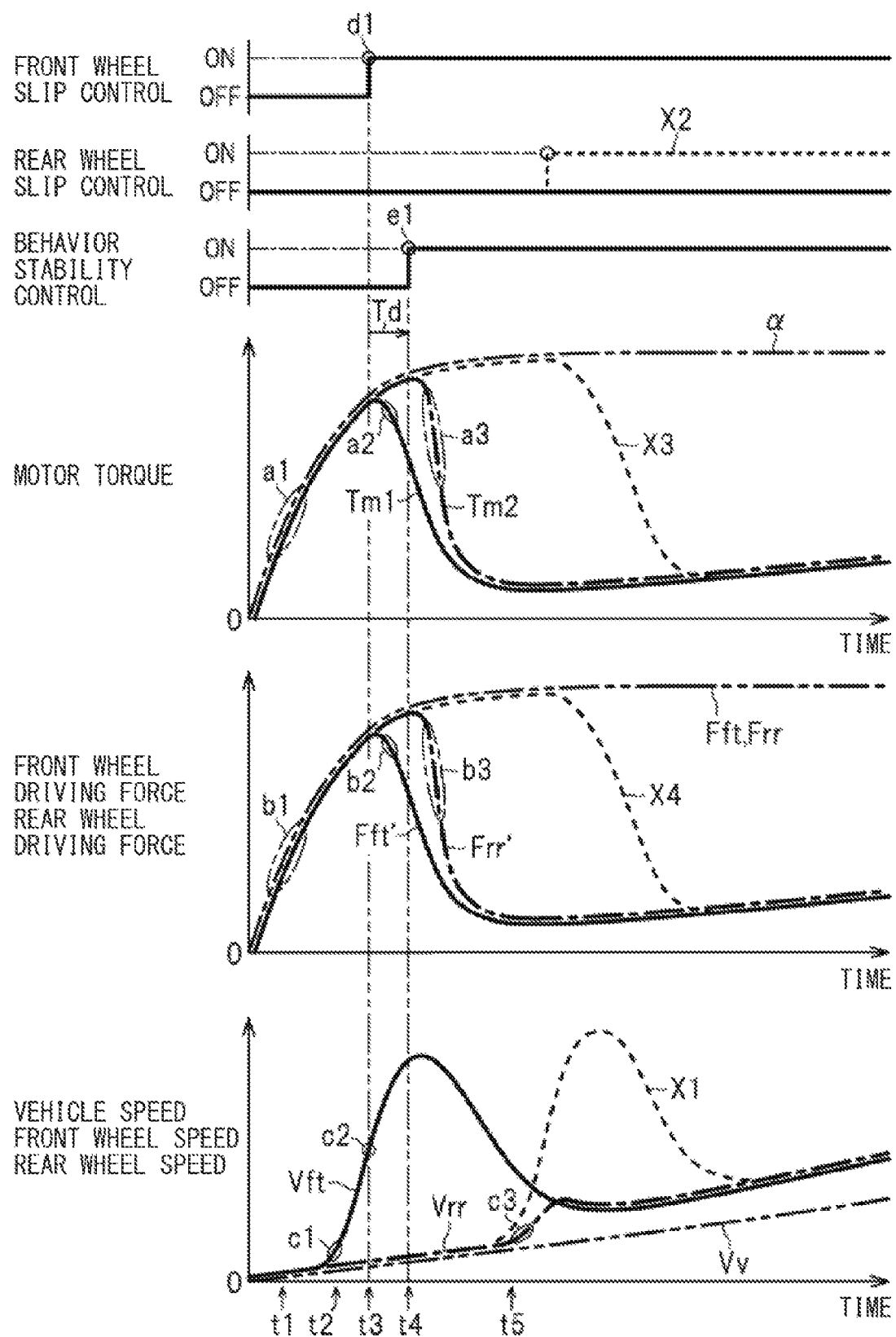
FIG. 7 is a timing chart illustrating an example of a state in which the behavior stability control is executed.

A description is given next of a state of execution of the behavior stability control with reference to a timing chart. FIG. 7 is a timing chart illustrating an example of the state in which the behavior stability control is executed. In an example of the timing chart illustrated in FIG. 7, a ratio of a distribution of driving force between the front wheels 12 and the rear wheels 20 is set to 50:50, and the front wheel requested driving force Fft and the rear wheel requested driving force Frr are at values that are equal to each other. Note that the timing chart of FIG. 7 illustrates a state in which the vehicle 11 moves to the low μ road from the high μ road while moving forward. It is to be also noted that, in the timing chart illustrated in FIG. 7, lines are depicted as being slightly shifted from each other even in a case where those lines are actually overlapped with each other, in order to clarify the transitions of the torque, the driving force, the speed, and any other factor.

In FIG. 7, a situation in which the front wheel slip control is "ON" is where the execution condition Fa is satisfied and the front wheel slip control is executed, and a situation in which the front wheel slip control is "OFF" is where the stop condition Fb is satisfied and the front wheel slip control is stopped. A situation in which the rear wheel slip control is "ON" is where the execution condition Ra is satisfied and the rear wheel slip control is executed, and a situation in which the rear wheel slip control is "OFF" is where the stop condition Rb is satisfied and the rear wheel slip control is stopped. Further, a situation in which a behavior stability flag is "ON" is where the behavior stability control is executed, and a situation in which the behavior stability flag is "OFF" is where the behavior stability control is stopped.

At a timing t1 illustrated in FIG. 7, in a situation where both the front wheels 12 and the rear wheels 20 are in contact with the high μ road, the target torque Tm1 of the motor generator MG1 may be set on the basis of the front wheel requested driving force Fft, and the target torque Tm2 of the motor generator MG2 may be set on the basis of the rear wheel requested driving force Frr (reference sign a1). Accordingly, the actual driving force Fft' of the front wheels 12 so makes the transition as to follow the front wheel requested driving force Fft, and the actual driving force Frr' of the rear wheels 20 so makes the transition as to follow the rear wheel requested driving force Frr (reference sign b1). Note that a dashed-two dotted line a illustrated in FIG. 7 denotes a motor torque necessary to obtain the front wheel requested driving force Fft and the rear wheel requested driving force Frr.

At a timing t2 illustrated in FIG. 7, in a situation where the front wheels 12 enter the low μ road from the high μ road, the front wheels 12 start to idle on the low μ road. Accordingly, the front wheel speed Vft so starts to increase as to be deviated from the vehicle speed Vv (reference sign c1). Thereafter, at a timing t3, in a case where the front wheel speed Vft so increases further as to be deviated from the vehicle speed Vv (reference sign c2), the front wheel slip control may be executed to suppress the idling of the front wheels 12 (reference sign d1). In other words, in a case where a difference in speed between the front wheel speed Vft and the vehicle speed Vv becomes large and the unillustrated slip rate SLft exceeds the predetermined threshold SL1, the execution condition Fa described above is satisfied and the front wheel slip control may be executed. Thus, in a case where the front wheel speed Vft increases and the front wheel slip control is executed accordingly, the target torque Tm1 of the motor generator MG1 is decreased (reference sign a2), and the actual driving force Fft' of the front wheels 12 is decreased (reference sign b2).

Thereafter, at a timing t4 illustrated in FIG. 7, in a case where the execution condition Fa of the front wheel slip control is satisfied and a state in which the execution condition Ra of the rear wheel slip control is unsatisfied is continued for the predetermined determining time Td, the behavior stability control may be executed that decreases the target torque Tm2 of the motor generator MG2 (reference sign e1). The behavior stability control may so control the target torque Tm2 of the motor generator MG2 as to cause the actual driving force Frr' of the rear wheels 20 to be converged to the actual driving force Fft' of the front wheels 12. In other words, the target torque Tm2 of the motor generator MG2 is so decreased (reference sign a3) as to cause the actual driving force Frr' of the rear wheels 20 to be decreased toward the actual driving force Fft' of the front wheels 12 (reference sign b3).

Thereafter, at a timing t5 illustrated in FIG. 7, in a situation where the rear wheels 20 enter the low μ road from the high μ road, the rear wheels 20 tend to idle easily. However, because the actual driving force Frr' of the rear wheels 20 has been already decreased, it is possible to suppress an increase in the rear wheel speed Vrr with respect to the vehicle speed Vv (reference sign c3). In other words, the behavior stability control is executed that decreases the target torque Tm2 prior to the rear wheel slip control. Hence, it is possible to decrease the actual driving force Frr' of the rear wheels 20 without waiting for the idling of the rear wheels 20 and thereby to increase the traveling stability of the vehicle 11.

If the behavior stability control is not executed, the rear wheels 20 idle and the rear wheel speed Vrr rapidly increases as denoted by a broken line X1, and the rear wheel slip control is executed as denoted by a broken line X2. Further, the target torque Tm2 of the motor generator MG2 is decreased as denoted by a broken line X3, and the actual driving force Frr' of the rear wheels 20 is decreased as denoted by a broken line X4. Accordingly, if the behavior stability control is not executed, the rear wheels 20 idle excessively, which can decrease the traveling stability upon the entry of the vehicle 11 to the low μ road. In contrast, by executing the behavior stability control, it is possible to decrease the actual driving force Frr' of the rear wheels 20 without waiting for the idling of the rear wheels 20 and thereby to increase the traveling stability of the vehicle 11.

Figure 8:
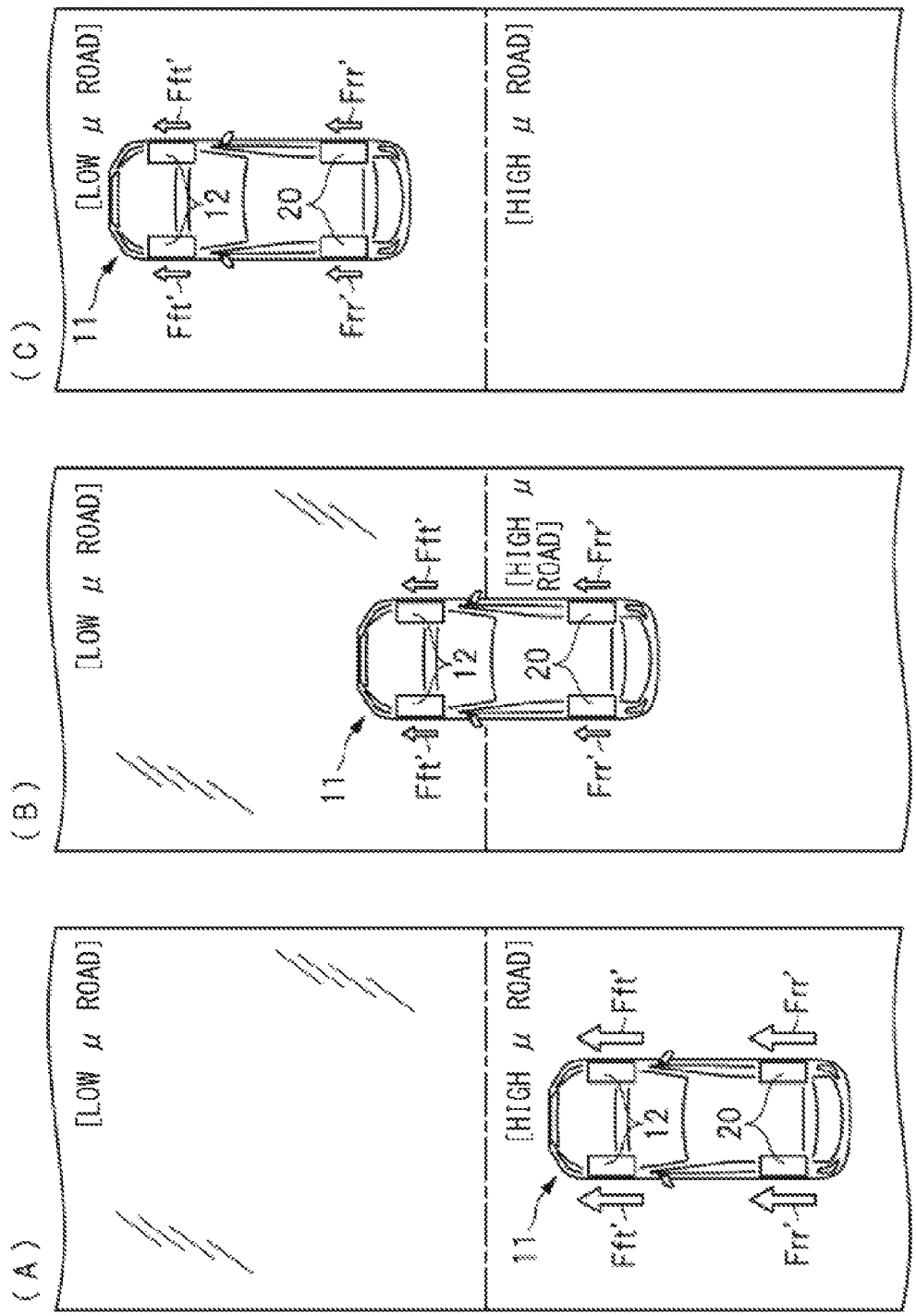
FIG. 8 is a diagram illustrating a vehicle that enters the low $\mu$ road from a high $\mu$ road.

FIG. 8 illustrates the vehicle 11 that enters the low μ road from the high μ road. In a situation where both the front wheels 12 and the rear wheels 20 are in contact with the high μ road as illustrated in (A) of FIG. 8, the actual driving force Fft' of the front wheels 12 may be controlled on the basis of the front wheel requested driving force Fft, and the actual driving force Frr' of the rear wheels 20 may be controlled on the basis of the rear wheel requested driving force Frr. Thereafter, in a case where the front wheels 12 enter the low μ road from the high μ road as illustrated in (B) of FIG. 8, the actual driving force Fft' of the front wheels 12 may be decreased by the front wheel slip control. Here, although the rear wheels 20 are still in contact with the high μ road, the behavior stability control described above is executed. Accordingly, the actual driving force Frr' of the rear wheels 20 is decreased without waiting for the idling of the rear wheels 20. Then, the rear wheels 20 enter the low μ road from the high μ road as illustrated in (B) and (C) of FIG. 8 with the actual driving force Frr' of the rear wheels 20 being decreased, making it possible to increase the traveling stability of the vehicle 11.

[Behavior Stability Control (Traveling while Making Turn)]

Figure 9:
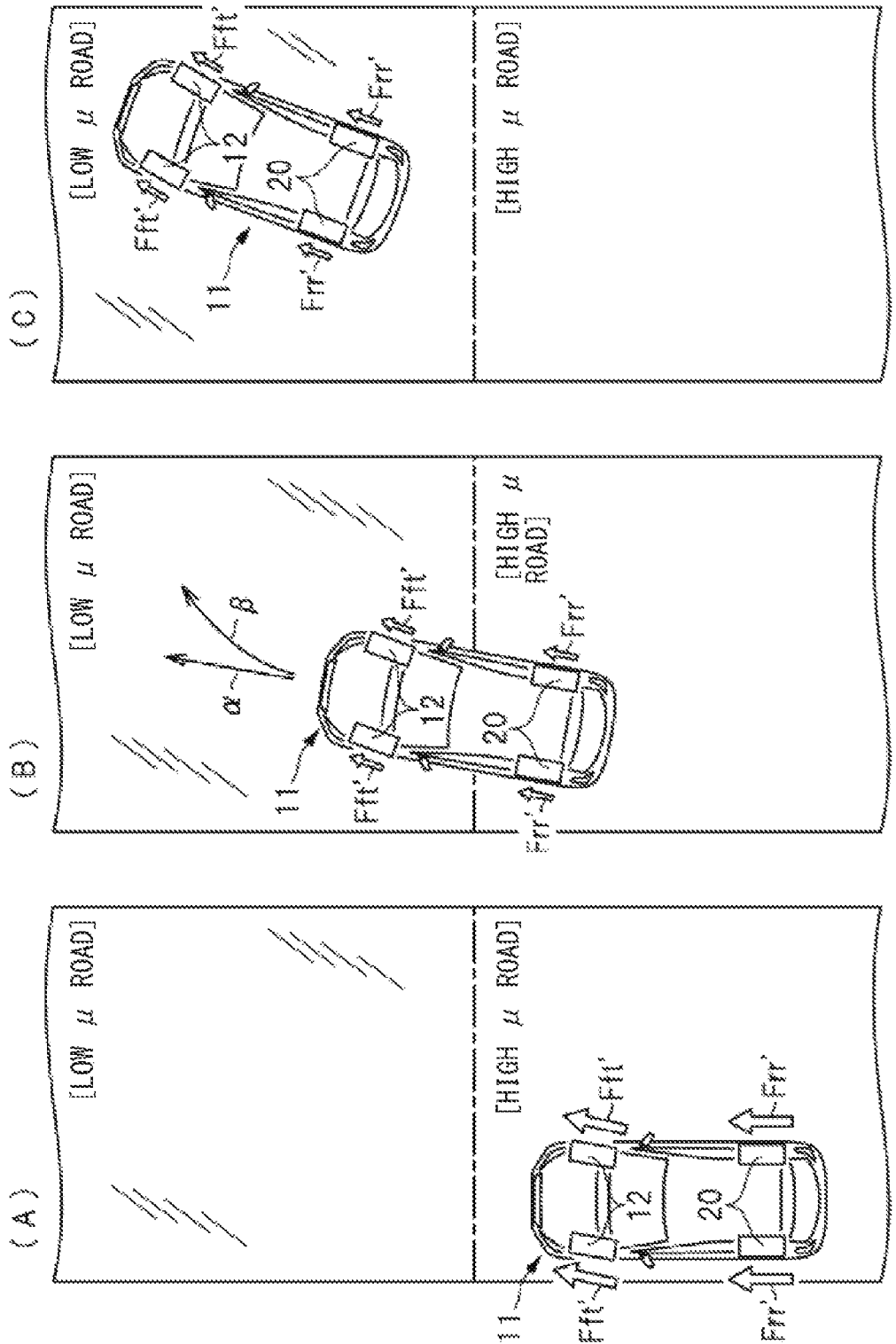
FIG. 9 is a diagram illustrating a vehicle that enters the low $\mu$ road from the high $\mu$ road while making a turn.
Figure 10:
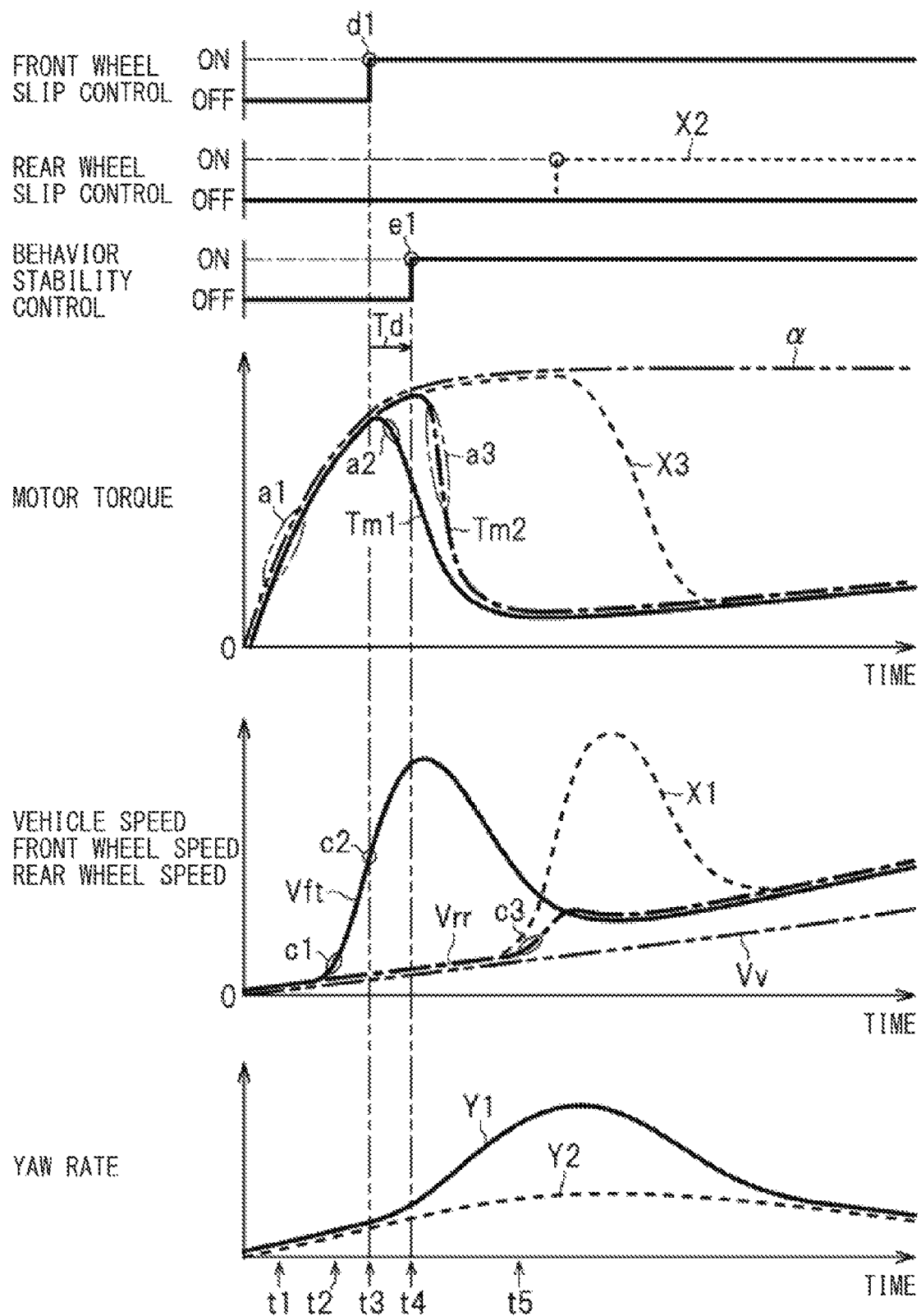
FIG. 10 is a timing chart illustrating an example of a yaw rate upon making a turn.

A description is given next of the behavior stability control upon making a turn. FIG. 9 illustrates the vehicle 11 that enters the low μ road from the high μ road while making a turn. FIG. 10 is a timing chart illustrating an example of a yaw rate upon making a turn. Note that, in the timing chart illustrated in FIG. 10, situations similar to those illustrated in FIG. 7 are denoted with the same reference numerals to avoid any redundant description. It is to be also noted that, in the timing chart illustrated in FIG. 10, lines are depicted as being slightly shifted from each other even in a case where those lines are actually overlapped with each other, in order to clarify the transitions of the torque, the speed, and any other factor.

In a situation where both the front wheels 12 and the rear wheels 20 are in contact with the high μ road as illustrated in (A) of FIG. 9, the actual driving force Fft' of the front wheels 12 may be controlled on the basis of the front wheel requested driving force Fft, and the actual driving force Frr' of the rear wheels 20 may be controlled on the basis of the rear wheel requested driving force Frr. Thereafter, in a case where the front wheels 12 enter the low μ road from the high μ road as illustrated in (B) of FIG. 9, the actual driving force Fft' of the front wheels 12 may be decreased by the front wheel slip control. Here, although the rear wheels 20 are still in contact with the high μ road, the behavior stability control described above is executed. Accordingly, the actual driving force Frr' of the rear wheels 20 is decreased without waiting for the idling of the rear wheels 20. Hence, it is possible to resolve the excessive understeer upon making a turn.

If the actual driving force Frr' of the rear wheels 20 are not decreased in a traveling situation illustrated in (B) of FIG. 9, the vehicle 11 is pushed strongly in an arrow α direction by the actual driving force Frr' of the rear wheels 20, leading to an occurrence of the large understeer. In contrast, the behavior stability control decreases the actual driving force Frr' of the rear wheels 20. Thus, the vehicle 11 is prevented from being pushed strongly in the arrow α direction by the actual driving force Frr' of the rear wheels 20. Hence, it is possible to allow the vehicle 11 to make a turn in an arrow β direction and to resolve the excessive understeer. In addition, the rear wheels 20 enter the low μ road from the high μ road as illustrated in (B) and (C) of FIG. 9 with the actual driving force Frr' of the rear wheels 20 being decreased, making it possible to increase the traveling stability of the vehicle 11.

For example, in a case where the target torque Tm2 is decreased promptly by the behavior stability control as illustrated in FIG. 10 (reference sign a3), it is possible to allow the vehicle 11 that makes a turn to generate a large yaw rate as denoted by a solid line Y1. In other words, executing the behavior stability control makes it possible to allow the vehicle 11 to make a turn appropriately. In contrast, if the decrease in the target torque Tm2 is delayed without the execution of the behavior stability control as denoted by a broken line X3, the yaw rate that the vehicle 11 generates upon making a turn decreases as denoted by a broken line Y2. In other words, it is difficult to allow the vehicle 11 to make a turn appropriately in a case where the behavior stability control is not executed.

Alternative Embodiment 1

Figure 11:
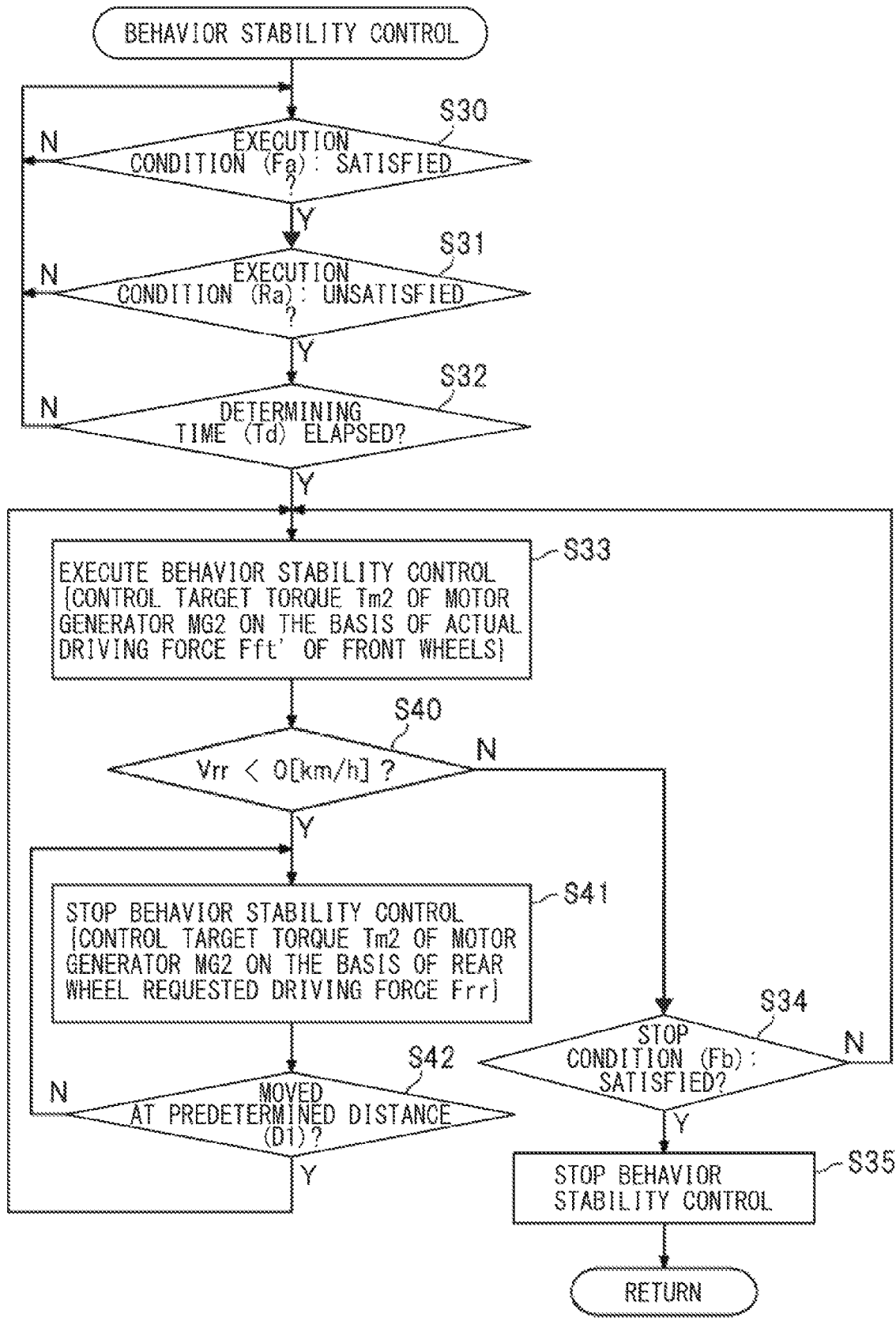
FIG. 11 is a flowchart illustrating another example of the process of executing the behavior stability control.

A description is given next of the behavior stability control to be executed by the vehicle controlling apparatus according to another embodiment of the technology. FIG. 11 is a flowchart illustrating another example of the process of executing the behavior stability control. Note that, in the flowchart illustrated in FIG. 11, steps similar to those illustrated in FIG. 6 are denoted with the same reference numerals to avoid any redundant description.

Referring to FIG. 11, if the execution condition Fa of the front wheel slip control is determined as being satisfied and the execution condition Ra of the rear wheel slip control is determined as being unsatisfied in steps S30 to S32, the process may proceed to step S33. In step S33, the behavior stability control may be executed that decreases the target torque Tm2 prior to the rear wheel slip control. In a case where the behavior stability control is thus executed, the process may proceed to step S40. In step S40, whether the rear wheel speed Vrr falls below 0 [km/h] may be determined. If the rear wheel speed Vrr is determined as falling below 0 [km/h] in step S40, i.e., if a direction of rotation of the rear wheels 20 is reversed after the target torque Tm2 is decreased by the behavior stability control, the process may proceed to step S41. In step S41, the behavior stability control may be stopped. In a case where the behavior stability control is thus stopped, as per normal, the target torque Tm2 of the motor generator MG2 may be controlled on the basis of the rear wheel requested driving force Frr set in accordance with, for example, the operation of the accelerator.

Thereafter, the process may proceed to step S42. In step S42, whether the vehicle 11 has moved in a forward direction at a predetermined distance D1 may be determined. In some embodiments, the predetermined distance D1 may be set to a length that exceeds a wheelbase of the vehicle 11. If the vehicle 11 is determined as being moved at the predetermined distance D1 in step S42, i.e., if the vehicle 11 is determined as being moved forward beyond the wheelbase, the process may return to step S33 in which the behavior stability control is resumed that decreases the target torque Tm2. If the vehicle 11 is determined as not reaching the predetermined distance D1, the process may return to step S41 in which a state where the behavior stability control is stopped is continued. As described above, the behavior stability control may be stopped in a case where the direction of rotation of the rear wheels 20 is reversed after the target torque Tm2 is decreased by the behavior stability control. Thus, the target torque Tm2 may be increased on the basis of the rear wheel requested driving force Frr. Hence, it is possible to allow the vehicle 11 to travel appropriately even in a case where a part of a sloped road is frozen as described below.

Figure 12:
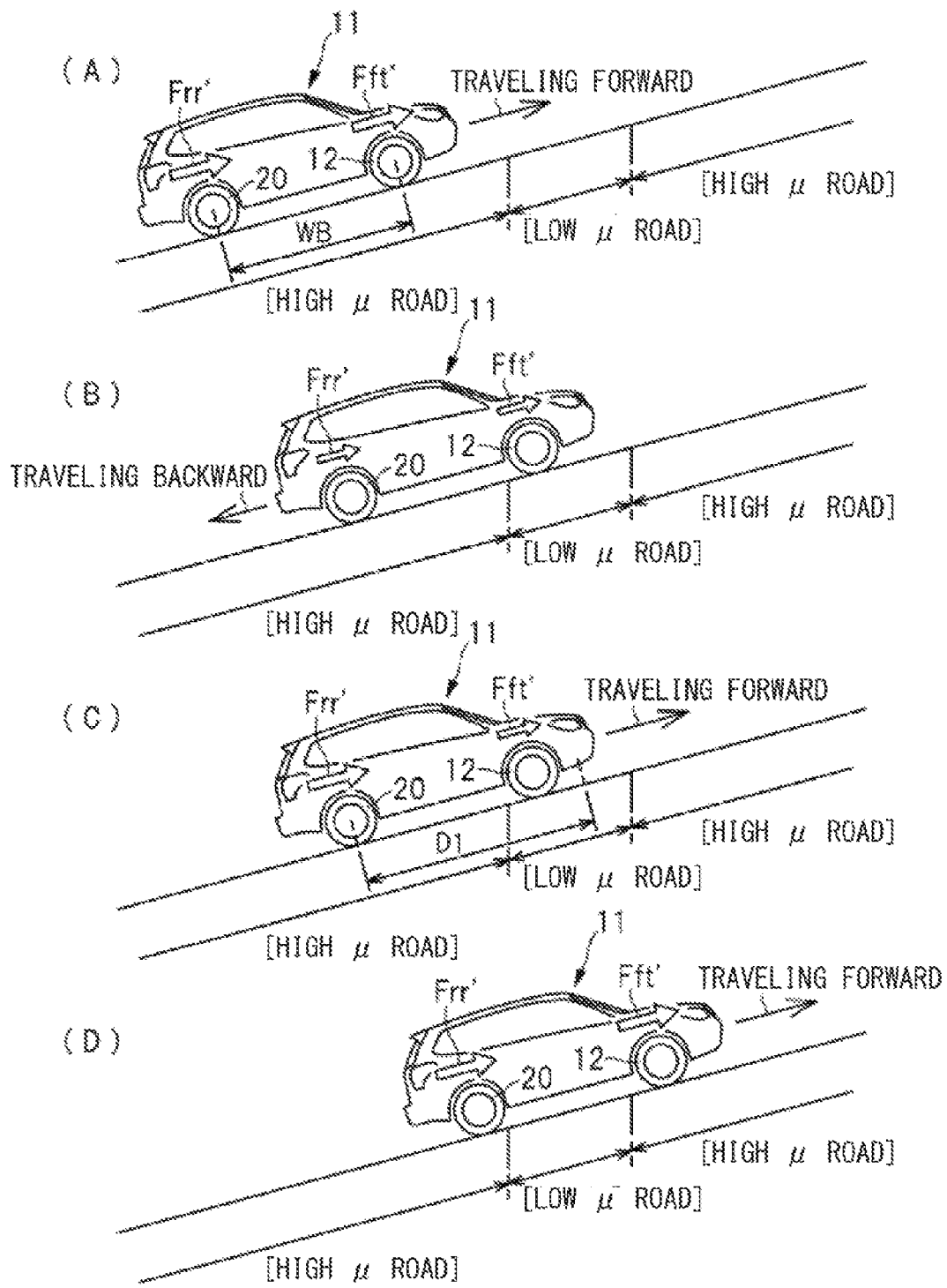
FIG. 12 is a diagram illustrating a vehicle that travels forward on a sloped road.

FIG. 12 illustrates the vehicle 11 that travels forward on a sloped road. In a situation where both the front wheels 12 and the rear wheels 20 are in contact with the high μ road as illustrated in (A) of FIG. 12, the actual driving force Fft' of the front wheels 12 may be controlled on the basis of the front wheel requested driving force Fft, and the actual driving force Frr' of the rear wheels 20 may be controlled on the basis of the rear wheel requested driving force Frr. Thereafter, in a case where the front wheels 12 enter the low μ road from the high μ road as illustrated in (B) of FIG. 12, the actual driving force Fft' of the front wheels 12 may be decreased by the front wheel slip control. Here, although the rear wheels 20 are still in contact with the high μ road, the behavior stability control described above is executed. Accordingly, the actual driving force Frr' of the rear wheels 20 is decreased without waiting for the idling of the rear wheels 20.

The situation illustrated in (B) of FIG. 12 is where the actual driving force Fft' of the front wheels 12 and the actual driving force Frr' of the rear wheels 20 are decreased. Accordingly, the vehicle 11 can travel backward depending on a weight of the vehicle 11 and a road surface gradient. However, as described above, the behavior stability control may be stopped in a case where the direction of rotation of the rear wheels 20 is reversed after the actual driving force Frr' of the rear wheels 20 is decreased by the behavior stability control, i.e., in a case where the vehicle 11 has traveled backward. Thus, as illustrated in (C) of FIG. 12, the target torque Tm2 is increased on the basis of the rear wheel requested driving force Frr and the actual driving force Frr' of the rear wheels 20 is increased. Hence, it is possible to allow the vehicle 11 to travel forward again. In some embodiments, the halt of the behavior stability control resulting from the backward traveling of the vehicle 11 may be continued until the vehicle 11 travels forward at the predetermined distance D1 that exceeds the wheelbase WB. Thus, as illustrated in (D) of FIG. 12, if the low μ road is within a limited range, it is possible to cause the front wheels 12 to be moved to the high μ road and to release the front wheel stop control. In other words, it is possible to allow the vehicle 11 to travel on the sloped road appropriately even if the actual driving force Frr' of the rear wheels 20 is decreased by the behavior stability control.

Referring back to FIG. 11, if the rear wheel speed Vrr is determined as being equal to or greater than 0 [km/h], the process may proceed to step S34. In step S34, whether the stop condition Fb of the front wheel slip control is satisfied may be determined. If the stop condition Fb is determined as not being satisfied in step S34, the process may return to step S33 in which the behavior stability control is continued that causes the actual driving force Frr' of the rear wheels 20 to follow the actual driving force Fft' of the front wheels 12. If the stop condition Fb is determined as being satisfied in step S34, the process may proceed to step S35 because the idling of the front wheels 12 is resolved. In step S35, the behavior stability control may be stopped. In a case where the behavior stability control is thus stopped, as per normal, the target torque Tm2 of the motor generator MG2 may be controlled on the basis of the rear wheel requested driving force Frr set in accordance with, for example, the operation of the accelerator.

Figure 13:
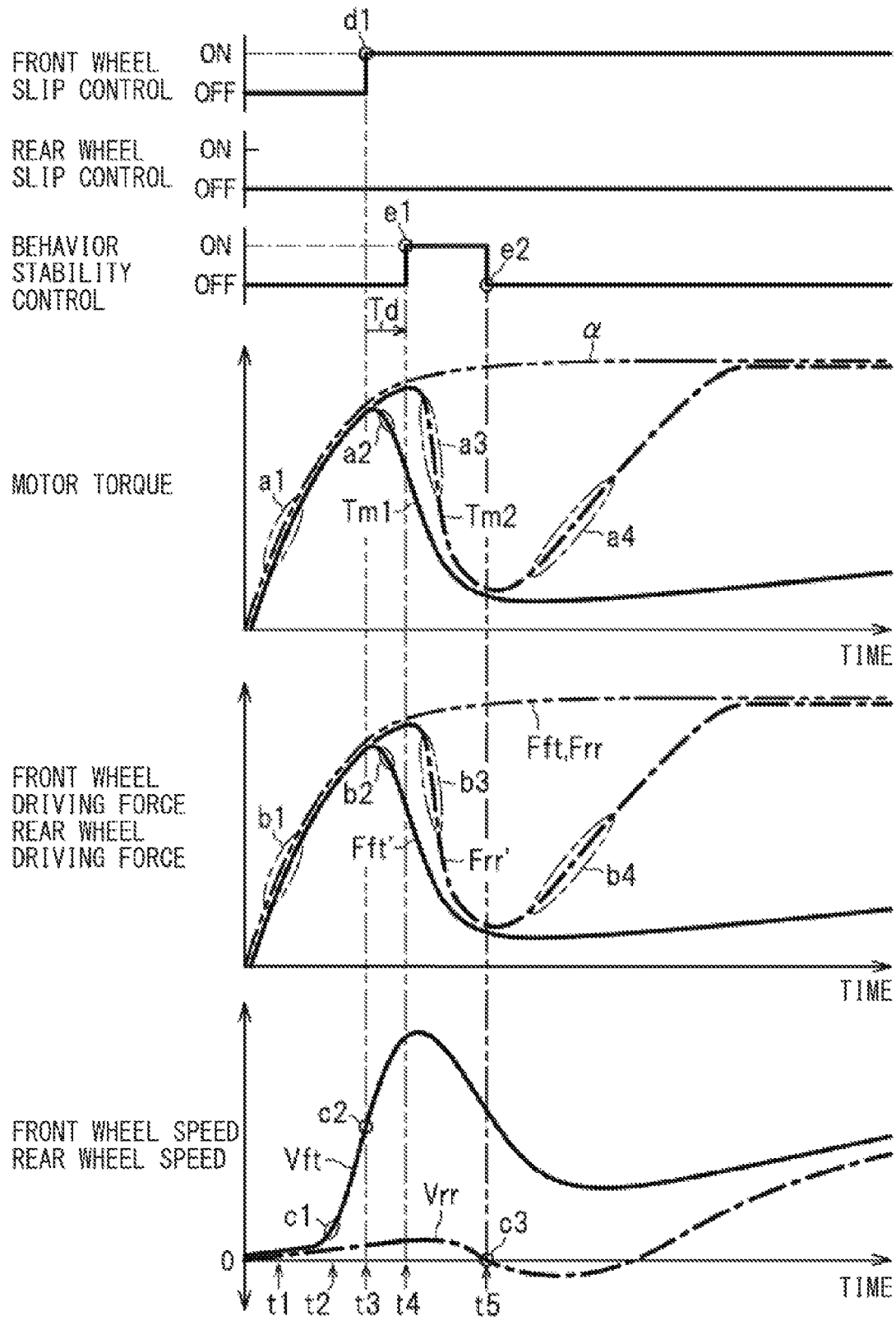
FIG. 13 is a timing chart illustrating an example of a state in which the behavior stability control is executed upon traveling on the sloped road.

A description is given next of the behavior stability control upon traveling on the sloped road with reference to a timing chart. FIG. 13 is a timing chart illustrating an example of a state in which the behavior stability control is executed upon traveling on the sloped road. The timing chart illustrated in FIG. 13 illustrates a state of the execution of the behavior stability control upon traveling on the sloped road illustrated in FIG. 12. Note that, in the timing chart illustrated in FIG. 13, situations similar to those illustrated in FIG. 7 are denoted with the same reference numerals to avoid any redundant description. It is to be also noted that, in the timing chart illustrated in FIG. 13, lines are depicted as being slightly shifted from each other even in a case where those lines are actually overlapped with each other, in order to clarify the transitions of the torque, the driving force, the speed, and any other factor.

At a timing t1 illustrated in FIG. 13, in a situation where both the front wheels 12 and the rear wheels 20 are in contact with the high μ road, the target torque Tm1 of the motor generator MG1 may be set on the basis of the front wheel requested driving force Fft, and the target torque Tm2 of the motor generator MG2 may be set on the basis of the rear wheel requested driving force Frr (reference sign a1). Accordingly, the actual driving force Fft' of the front wheels 12 so makes the transition as to follow the front wheel requested driving force Fft, and the actual driving force Frr' of the rear wheels 20 so makes the transition as to follow the rear wheel requested driving force Frr (reference sign b1). Note that a dashed-two dotted line a illustrated in FIG. 13 denotes a motor torque necessary to obtain the front wheel requested driving force Fft and the rear wheel requested driving force Frr.

At a timing t2 illustrated in FIG. 13, in a situation where the front wheels 12 enter the low μ road from the high μ road, the front wheels 12 start to idle on the low μ road. Accordingly, the front wheel speed Vft so starts to increase as to be deviated from the vehicle speed Vv (reference sign c1). Thereafter, at a timing t3, in a case where the front wheel speed Vft so increases further as to be deviated from the vehicle speed Vv (reference sign c2), the front wheel slip control may be executed to suppress the idling of the front wheels 12 (reference sign d1). In other words, in a case where a difference in speed between the front wheel speed Vft and the vehicle speed Vv becomes large and the unillustrated slip rate SLft exceeds the predetermined threshold SL1, the execution condition Fa described above is satisfied and the front wheel slip control may be executed. Thus, in a case where the front wheel speed Vft increases and the front wheel slip control is executed accordingly, the target torque Tm1 of the motor generator MG1 is decreased (reference sign a2), and the actual driving force Fft' of the front wheels 12 is decreased (reference sign b2).

Thereafter, at a timing t4 illustrated in FIG. 13, in a case where the execution condition Fa of the front wheel slip control is satisfied and a state in which the execution condition Ra of the rear wheel slip control is unsatisfied is continued for the predetermined determining time Td, the behavior stability control may be executed that decreases the target torque Tm2 of the motor generator MG2 (reference sign e1). The behavior stability control may so control the target torque Tm2 of the motor generator MG2 as to cause the actual driving force Frr' of the rear wheels 20 to be converged to the actual driving force Fft' of the front wheels 12. In other words, the target torque Tm2 of the motor generator MG2 is so decreased (reference sign a3) as to cause the actual driving force Frr' of the rear wheels 20 to be decreased toward the actual driving force Fft' of the front wheels 12 (reference sign b3).

Thereafter, at a timing t5 illustrated in FIG. 13, in a case where the rear wheel speed Vrr falls below 0 [km/h], the behavior stability control may be stopped (reference sign e2), and the target torque Tm2 of the motor generator MG2 may be so controlled as to cause the actual driving force Frr' of the rear wheels 20 to be converged to the rear wheel requested driving force Frr. In other words, the target torque Tm2 of the motor generator MG2 is so increased (reference sign a4) as to cause the actual driving force Frr' of the rear wheels 20 to be increased toward the rear wheel requested driving force Frr (reference sign b4). Thus, the actual driving force Frr' of the rear wheels 20 is increased, making it possible to allow the vehicle 11 to travel forward again. In other words, it is possible to allow the vehicle 11 to travel on the sloped road appropriately even if the actual driving force Frr' of the rear wheels 20 is decreased by the behavior stability control.

Alternative Embodiment 2

In an example embodiment described above, the front wheels 12 serves as the first drive wheel between one of the front wheels 12 and the rear wheels 20, and the rear wheels 20 serves as the second drive wheel between the other of the front wheels 12 and the rear wheels 20. Further, in an example embodiment described above, the behavior stability control decreases the target torque of the motor generator MG2. Any embodiment of the technology, however, is not limited thereto. In an alternative example embodiment, the rear wheels 20 may serve as the first drive wheel between one of the front wheels 12 and the rear wheels 20, and the front wheels 12 may serve as the second drive wheel between the other of the front wheels 12 and the rear wheels 20. Further, in such an alternative example embodiment, the behavior stability control may decrease the target torque of the motor generator MG1. In this example embodiment, the rear wheels 20 may serve as the first drive wheel, the motor generator MG2 may serve as the first motor, the front wheels 12 may serve as the second drive wheels, and the motor generator MG1 may serve as the second motor.

Figure 14:
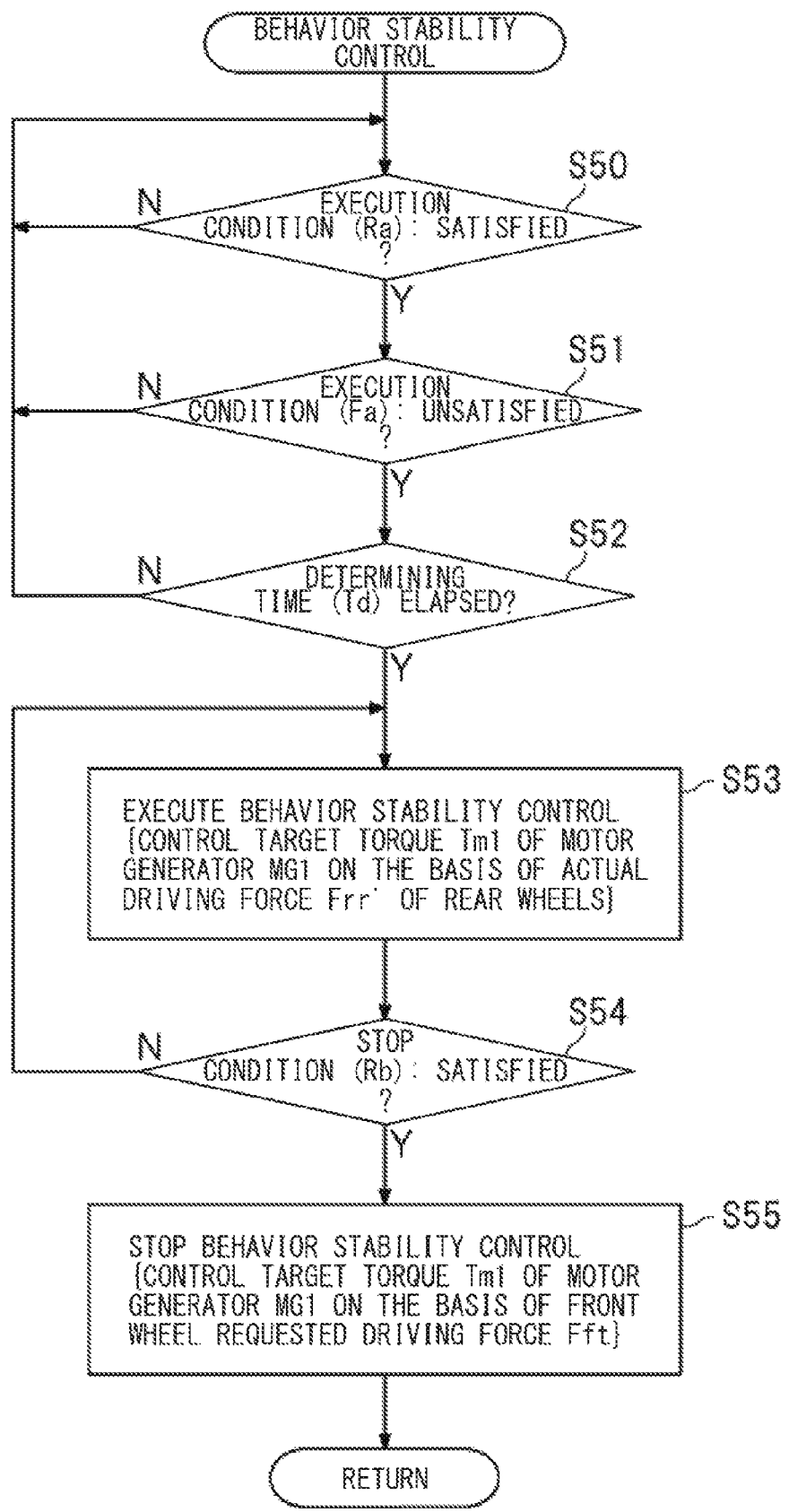
FIG. 14 is a flowchart illustrating another example of the process of executing the behavior stability control.

FIG. 14 is a flowchart illustrating another example of the process of executing the behavior stability control. Referring to FIG. 14, in step S50, whether the execution condition Ra of the rear wheel slip control is satisfied may be determined on the basis of, for example, the slip rate SLrr of the rear wheels 20. If the execution condition Ra is determined as being satisfied in step S50, the process may proceed to step S51. In step S51, whether the execution condition Fa of the front wheel slip control is unsatisfied may be determined on the basis of, for example, the slip rate SLft of the front wheels 12. If the execution condition Fa of the front wheel slip control is determined as being unsatisfied in step S51, the process may proceed to step S52. In step S52, whether the predetermined determining time Td has elapsed may be determined. In some embodiments, the determining time Td may be any of several milliseconds. In some embodiments, the determining time Td may be any of tens of milliseconds. In step S52, if the determining time Td is determined as being elapsed, i.e., if the execution condition Ra is satisfied and a state in which the execution condition Fa is unsatisfied is continued for the determining time Td, the process may proceed to step S53 to execute the behavior stability control.

As described above, the process may proceed to step S53 to execute the behavior stability control, in a case where the execution condition Ra of the rear wheel slip control is satisfied and the execution condition Fa of the front wheel slip control is unsatisfied. In an example embodiment, the behavior stability control controls the target torque Tm1 of the motor generator MG1 on the basis of the actual driving force Frr' of the rear wheels 20. For example, the target torque Tm1 of the motor generator MG1 may be so set prior to the front wheel slip control as to be decreased from the most recent target torque such that the actual driving force Fft' of the front wheels 12 is converged to the actual driving force Frr' of the rear wheels 20. In a case where the rear wheel slip control is executed due to the idling of the rear wheels 20, the front wheel slip control is expected to be executed thereafter due to idling of the front wheels 12. Accordingly, in an example embodiment, the behavior stability control may be executed that decreases the target torque Tm1 prior to the front wheel slip control. Hence, it is possible to decrease the actual driving force Fft' of the front wheels 12 without waiting for the idling of the front wheels 12 and thereby to increase the traveling stability upon the entry of the vehicle 11 to the low μ road.

Thereafter, in step S54, whether the stop condition Rb of the rear wheel slip control is satisfied may be determined. If the stop condition Rb is determined as not being satisfied in step S54, the process may return to step S53 in which the behavior stability control is continued that causes the actual driving force Fft' of the front wheels 12 to follow the actual driving force Frr' of the rear wheels 20. If the stop condition Rb is determined as being satisfied in step S54, the process may proceed to step S55 because the idling of the rear wheels 20 is resolved. In step S55, the behavior stability control may be stopped. In a case where the behavior stability control is thus stopped, as per normal, the target torque Tm1 of the motor generator MG1 may be controlled on the basis of the front wheel requested driving force Fft set in accordance with, for example, the operation of the accelerator.

Alternative Embodiment 3

Figure 15:
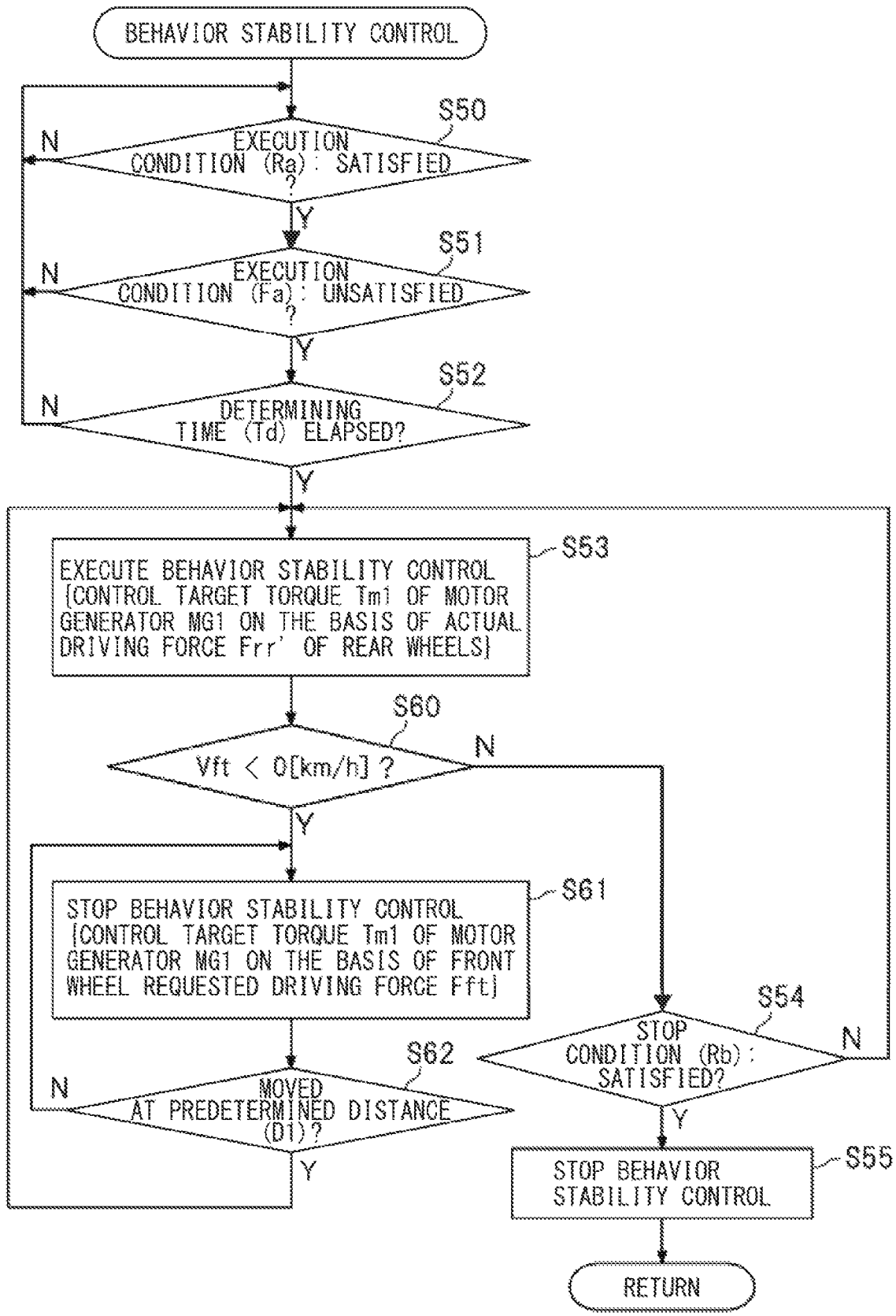
FIG. 15 is a flowchart illustrating another example of the process of executing the behavior stability control.

A description is given next of the behavior stability control to be executed by the vehicle controlling apparatus according to another embodiment of the technology. FIG. 15 is a flowchart illustrating another example of the process of executing the behavior stability control. Note that, in the flowchart illustrated in FIG. 15, steps similar to those illustrated in FIG. 14 are denoted with the same reference numerals to avoid any redundant description.

Referring to FIG. 15, if the execution condition Ra of the rear wheel slip control is determined as being satisfied and the execution condition Fa of the front wheel slip control is determined as being unsatisfied in steps S50 to S52, the process may proceed to step S53. In step S53, the behavior stability control may be executed that decreases the target torque Tm1 prior to the front wheel slip control. In a case where the behavior stability control is thus executed, the process may proceed to step S60. In step S60, whether the front wheel speed Vft falls below 0 [km/h] may be determined. If the front wheel speed Vft is determined as falling below 0 [km/h] in step S60, i.e., if a direction of rotation of the front wheels 12 is reversed after the target torque Tm1 is decreased by the behavior stability control, the process may proceed to step S61. In step S61, the behavior stability control may be stopped. In a case where the behavior stability control is thus stopped, as per normal, the target torque Tm1 of the motor generator MG1 may be controlled on the basis of the front wheel requested driving force Fft set in accordance with, for example, the operation of the accelerator.

Thereafter, the process may proceed to step S62. In step S62, whether the vehicle 11 has moved in the forward direction at the predetermined distance D1 may be determined. In some embodiments, the predetermined distance D1 may be set to the length that exceeds the wheelbase of the vehicle 11. If the vehicle 11 is determined as being moved at the predetermined distance D1 in step S62, i.e., if the vehicle 11 is determined as being moved beyond the wheelbase, the process may return to step S53 in which the behavior stability control is resumed that decreases the target torque Tm1. If the vehicle 11 is determined as not reaching the predetermined distance D1, the process may return to step S61 in which a state where the behavior stability control is stopped is continued. As described above, the behavior stability control may be stopped in a case where the direction of rotation of the front wheels 12 is reversed after the target torque Tm1 is decreased by the behavior stability control. Thus, the target torque Tm1 may be increased on the basis of the front wheel requested driving force Fft. Hence, it is possible to allow the vehicle 11 to travel appropriately even in a case where a part of the sloped road is frozen as described with reference to FIG. 12.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. For example, in an example embodiment described above, the vehicle 11 to which the vehicle controlling apparatus 10 is applied may be the electric vehicle having no engine. Any embodiment of the technology, however, is not limited thereto. In some embodiments, the vehicle 11 may be a hybrid vehicle of a series type having the engine. In an example embodiment described above, the vehicle 11 may drive two front wheels 12 by one motor generator MG1 and drives two rear wheels 20 by one motor generator MG2. Any embodiment of the technology, however, is not limited thereto. In some embodiments, the vehicle 11 may include four motor generators to drive one wheel by one motor generator. In an example embodiment described above, the main controller 40 may serve as the first slip determining unit 45, the first slip controller 46, the second slip determining unit 47, the second slip controller 48, and the target torque corrector 49. Any embodiment of the technology, however, is not limited thereto. In some embodiments, any other controller or a plurality of controllers may be used to configure the first slip determining unit 45, the first slip controller 46, the second slip determining unit 47, the second slip controller 48, and the target torque corrector 49.

In an example embodiment described above, the slip control may be executed on the basis of the slip rates SLft and SLrr. Any embodiment of the technology, however, is not limited thereto. In some embodiments, a difference in rotation speed between the vehicle speed Vv and the front wheel speed Vft may be used as a value that represents the idling state of the front wheels 12, and a difference in rotation speed between the vehicle speed Vv and the rear wheel speed Vrr may be used as a value that represents the idling state of the rear wheels 20. In an example embodiment described above, the slip rates SLft and SLrr may be controlled on the basis of the common target slip rate Sx for both the rear wheel slip control and the rear wheel slip control. Any embodiment of the technology, however, is not limited thereto. In some embodiments, the target slip rate used for the front wheel slip control and the target slip rate used for the rear wheel slip control may be different from each other.

In an example embodiment described with reference to the flowchart illustrated in FIG. 11 or FIG. 15, the behavior stability control may be stopped in a case where the vehicle 11 that performs the forward traveling of the sloped road has moved backward as a result of the execution of the behavior stability control. Any embodiment of the technology, however, is not limited thereto. In some embodiments, the behavior stability control may be stopped in a case where the vehicle 11 that performs backward traveling of the sloped road has moved forward as a result of the execution of the behavior stability control. In an example embodiment described above, the execution condition of the slip control may be a case where the slip rates SLft and SLrr exceed the predetermined threshold SL1, and the stop condition of the slip control may be a case where the slip rates SLft and SLrr fall below the predetermined threshold SL2. Any embodiment of the technology, however, is not limited thereto. In some embodiments, the execution condition of the slip control may be a case where the accelerator position Acc exceeds a predetermined threshold and the slip rates SLft and SLrr exceed the predetermined threshold SL1. In some embodiments, the stop condition of the slip control may be a case where the accelerator position Acc falls below a predetermined threshold and the slip rates SLft and SLrr fall below the predetermined threshold SL2.

The main controller 40 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 40 illustrated in FIG. 1.

The invention claimed is:

1. A vehicle controlling apparatus configured to control a first motor coupled to a first drive wheel and a second motor coupled to a second drive wheel, the first drive wheel and the second drive wheel being disposed at front and rear of a vehicle, the vehicle controlling apparatus comprising:
    a first slip determining unit configured to determine whether an execution condition of a first slip control is satisfied, on a basis of an idling state of the first drive wheel;
    a first slip controller configured to control the first motor and maintain a slip rate of the first drive wheel at a predetermined first slip rate, in a case where the execution condition of the first slip control is determined by the first slip determining unit as being satisfied;
    a second slip determining unit configured to determine whether an execution condition of a second slip control is satisfied, on a basis of an idling state of the second drive wheel;
    a second slip controller configured to control the second motor and maintain a slip rate of the second drive wheel at a predetermined second slip rate, in a case where the execution condition of the second slip control is determined by the second slip determining unit as being satisfied; and
    a target torque corrector configured to decrease a target torque of the second motor, in a case where the execution condition of the first slip control is determined by the first slip determining unit as being satisfied and where the execution condition of the second slip control is determined by the second slip determining unit as being unsatisfied.

2. The vehicle controlling apparatus according to claim 1, wherein the target torque corrector is configured to decrease the target torque of the second motor on a basis of a driving force of the first drive wheel, in the case where the execution condition of the first slip control is determined by the first slip determining unit as being satisfied and where the execution condition of the second slip control is determined by the second slip determining unit as being unsatisfied.

3. The vehicle controlling apparatus according to claim 1, wherein the target torque corrector is configured to increase the target torque of the second motor on a basis of a requested driving force of the second drive wheel, in a case where a direction of rotation of the second drive wheel is reversed after the target torque corrector has decreased the target torque of the second motor.

4. The vehicle controlling apparatus according to claim 2, wherein the target torque corrector is configured to increase the target torque of the second motor on a basis of a requested driving force of the second drive wheel, in a case where a direction of rotation of the second drive wheel is reversed after the target torque corrector has decreased the target torque of the second motor.

5. The vehicle controlling apparatus according to claim 3, wherein the target torque corrector is configured to increase the target torque of the second motor on the basis of the requested driving force of the second drive wheel, until the vehicle travels at a predetermined distance that exceeds a wheelbase of the vehicle.

6. The vehicle controlling apparatus according to claim 4, wherein the target torque corrector is configured to increase the target torque of the second motor on the basis of the requested driving force of the second drive wheel, until the vehicle travels at a predetermined distance that exceeds a wheelbase of the vehicle.

7. The vehicle controlling apparatus according to claim 1, wherein the first drive wheel comprises a front wheel and the second drive wheel comprises a rear wheel.

8. The vehicle controlling apparatus according to claim 2, wherein the first drive wheel comprises a front wheel and the second drive wheel comprises a rear wheel.

9. The vehicle controlling apparatus according to claim 3, wherein the first drive wheel comprises a front wheel and the second drive wheel comprises a rear wheel.

10. The vehicle controlling apparatus according to claim 4, wherein the first drive wheel comprises a front wheel and the second drive wheel comprises a rear wheel.

11. The vehicle controlling apparatus according to claim 5, wherein the first drive wheel comprises a front wheel and the second drive wheel comprises a rear wheel.

12. The vehicle controlling apparatus according to claim 6, wherein the first drive wheel comprises a front wheel and the second drive wheel comprises a rear wheel.

13. A vehicle controlling apparatus configured to control a first motor coupled to a first drive wheel and a second motor coupled to a second drive wheel, the first drive wheel and the second drive wheel being disposed at front and rear of a vehicle, the vehicle controlling apparatus comprising
circuitry configured to
determine whether an execution condition of a first slip control is satisfied, on a basis of an idling state of the first drive wheel,
control the first motor and maintain a slip rate of the first drive wheel at a predetermined first slip rate, in a case where the execution condition of the first slip control is determined as being satisfied,
determine whether an execution condition of a second slip control is satisfied, on a basis of an idling state of the second drive wheel,
control the second motor and maintain a slip rate of the second drive wheel at a predetermined second slip rate, in a case where the execution condition of the second slip control is determined as being satisfied, and
decrease a target torque of the second motor, in a case where the execution condition of the first slip control is determined as being satisfied and where the execution condition of the second slip control is determined as being unsatisfied.

* * * * *